US010560534B2

(12) United States Patent
Takahashi

(10) Patent No.: US 10,560,534 B2
(45) Date of Patent: Feb. 11, 2020

(54) INFORMATION PROCESSING APPARATUS, COMMUNICATION TERMINAL, AND COMMUNICATION SYSTEM FOR ENABLING A DISCONNECT OF COMMUNICATION BETWEEN THE INFORMATION PROCESSING APPARATUS AND THE COMMUNICATION TERMINAL

(71) Applicant: Teruaki Takahashi, Kanagawa (JP)

(72) Inventor: Teruaki Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 449 days.

(21) Appl. No.: 15/332,156

(22) Filed: Oct. 24, 2016

(65) Prior Publication Data

US 2017/0134504 A1 May 11, 2017

(30) Foreign Application Priority Data

Nov. 6, 2015 (JP) .................. 2015-218415
Apr. 26, 2016 (JP) .................. 2016-087835

(51) Int. Cl.
*H04L 29/08* (2006.01)
*H04N 1/327* (2006.01)
(Continued)

(52) U.S. Cl.
CPC .......... *H04L 67/143* (2013.01); *H04L 49/901* (2013.01); *H04N 1/32786* (2013.01);
(Continued)

(58) Field of Classification Search
CPC ... H04L 67/2823; H04L 67/125; H04L 67/04; H04L 67/143; H04L 49/901; H04L 43/08;
(Continued)

(56) References Cited

U.S. PATENT DOCUMENTS

2010/0069008 A1   3/2010   Oshima et al.
2011/0051185 A1   3/2011   Takahashi
(Continued)

FOREIGN PATENT DOCUMENTS

| JP | 2003-061159 | 2/2003 |
| JP | 2007-214804 | 8/2007 |
| JP | 2010-098717 | 4/2010 |
| JP | 2010-187104 | 8/2010 |
| JP | 2014-068304 | 4/2014 |
| JP | 2015-61191  | 3/2015 |

OTHER PUBLICATIONS

Office Action dated Oct. 29, 2019 in Japanese Application No. 2016-087835.

*Primary Examiner* — Abdulkader M Alriyashi
(74) *Attorney, Agent, or Firm* — Oblon, McClelland, Maier & Neustadt, L.L.P.

(57) ABSTRACT

An information processing apparatus is configured to communicate with a communication terminal. The apparatus includes a receiver, circuitry, and a transmitter. The receiver receives, from the communication terminal, a transmission request that requests that the information processing apparatus transmit a disconnection request to the communication terminal. The disconnection request is a request for requesting disconnection of a communication between the information processing apparatus and the communication terminal. The circuitry issues, in response to receiving the transmission request, an instruction for transmission of the disconnection request to the communication terminal. The transmitter transmits the disconnection request to the communication terminal in accordance with the instruction. The transmitter disconnects the communication between the information processing apparatus and the communication terminal in response to receiving a reply to the disconnection request from the communication terminal.

12 Claims, 20 Drawing Sheets

(51) Int. Cl.
*H04L 12/879* (2013.01)
*H04W 76/30* (2018.01)
*H04L 12/26* (2006.01)
*H04W 4/80* (2018.01)

(52) U.S. Cl.
CPC ............ *H04W 76/30* (2018.02); *H04L 43/08* (2013.01); *H04N 2201/0094* (2013.01); *H04W 4/80* (2018.02)

(58) Field of Classification Search
CPC ...... H04N 1/32786; H04N 2201/0094; H04W 76/30; H04W 4/80
See application file for complete search history.

(56) References Cited

U.S. PATENT DOCUMENTS

| | | |
|---|---|---|
| 2011/0058208 A1 | 3/2011 | Takahashi |
| 2012/0196534 A1* | 8/2012 | Kasslin ................. H04W 76/40 455/41.2 |
| 2013/0027744 A1 | 1/2013 | Takahashi |
| 2014/0029033 A1 | 1/2014 | Takahashi |
| 2014/0129012 A1* | 5/2014 | Ochi ....................... G06F 3/165 700/94 |
| 2014/0340713 A1 | 11/2014 | Takahashi |
| 2015/0092231 A1* | 4/2015 | Shibata ................. H04W 76/36 358/1.15 |

* cited by examiner

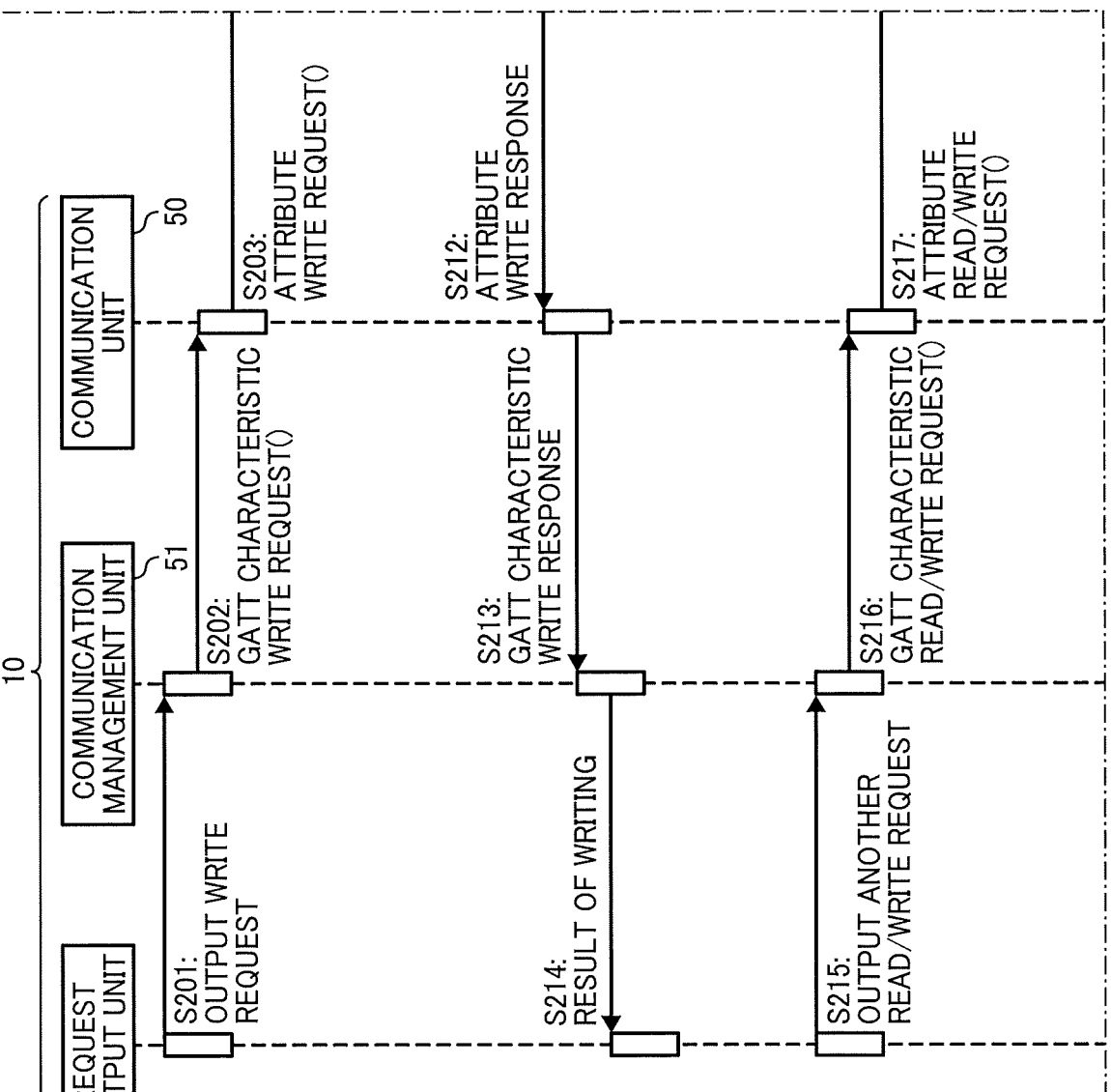

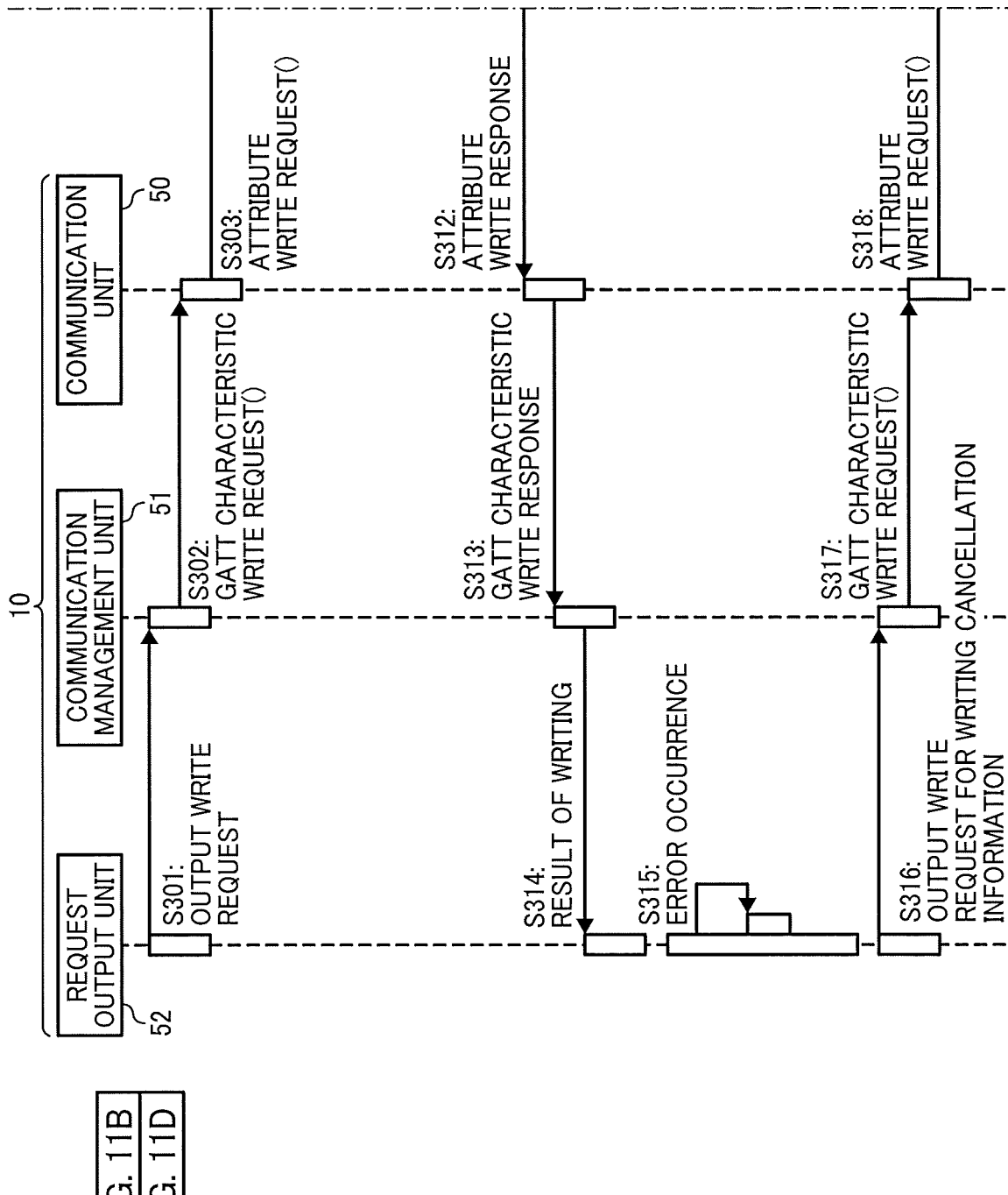

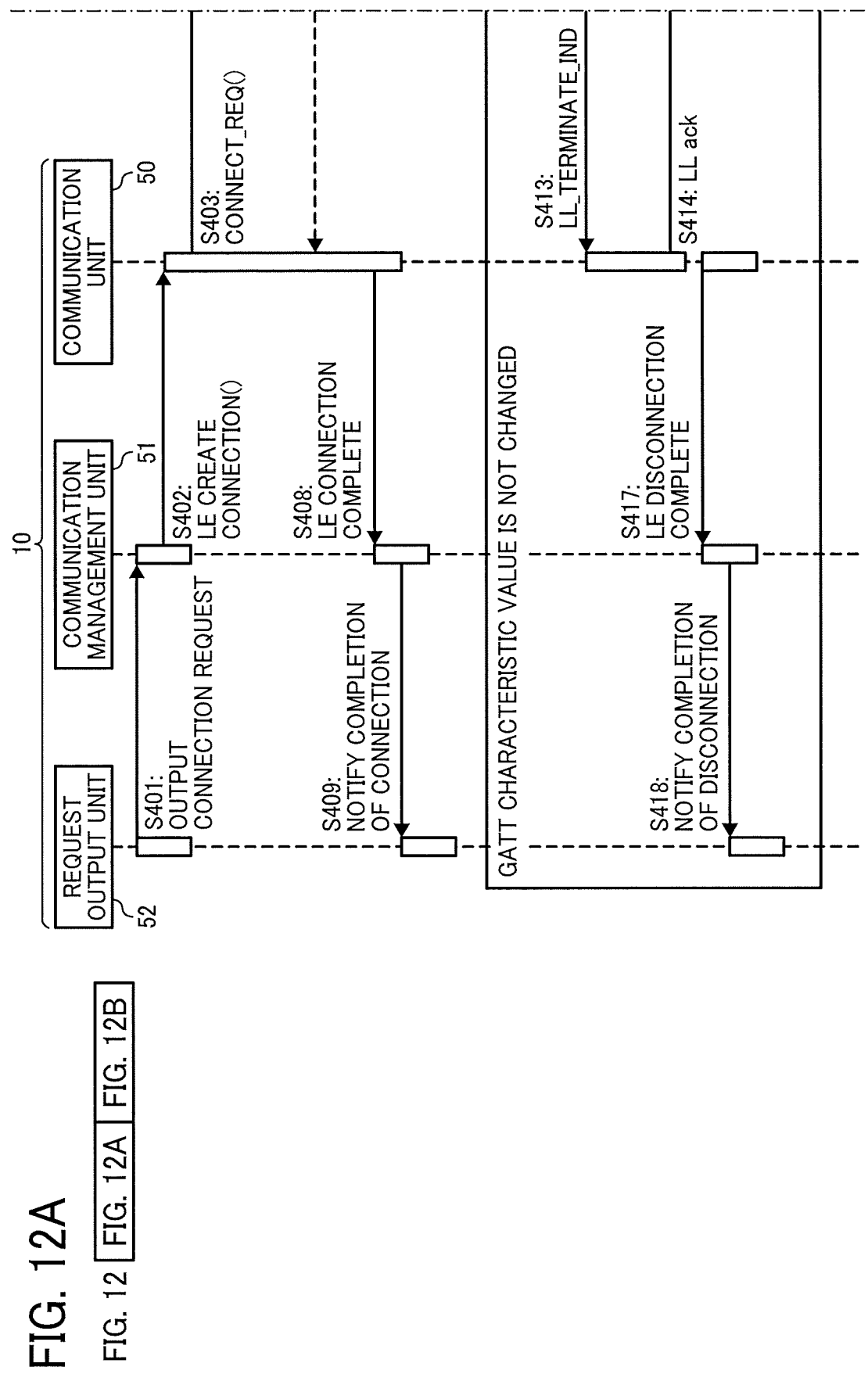

INFORMATION PROCESSING APPARATUS, COMMUNICATION TERMINAL, AND COMMUNICATION SYSTEM FOR ENABLING A DISCONNECT OF COMMUNICATION BETWEEN THE INFORMATION PROCESSING APPARATUS AND THE COMMUNICATION TERMINAL

CROSS-REFERENCE TO RELATED APPLICATIONS

This patent application is based on and claims priority pursuant to 35 U.S.C. § 119(a) to Japanese Patent Application Nos. 2015-218415, filed on Nov. 6, 2015, and 2016-087835, filed on Apr. 26, 2016 in the Japan Patent Office, the entire disclosures of which are hereby incorporated by reference herein.

BACKGROUND

Technical Field

The present disclosure relates to an information processing apparatus, a communication terminal, and a communication system.

Description of the Related Art

Communication terminals such as a smart device or an information processing apparatus such as a server include an operating system (OS), which is software for executing basic functions of these devices or performing control of these devices. The OS provides common basic functions used by various software such as drivers and applications. An application programmable interface, which defines procedures for invoking and using the basic functions of the OS, is open to the public. A software developer only has to describe a program for invoking the functions of the OS according to the API in building software.

One of the functions provided by the OS is to establish a wireless communication link or to disconnect the established wireless communication link.

SUMMARY

An information processing apparatus is configured to communicate with a communication terminal. The apparatus includes a receiver, circuitry, and a transmitter. The receiver receives, from the communication terminal, a transmission request that requests that the information processing apparatus transmit a disconnection request to the communication terminal. The disconnection request is a request for requesting disconnection of a communication between the information processing apparatus and the communication terminal. The circuitry issues, in response to receiving the transmission request, an instruction for transmission of the disconnection request to the communication terminal. The transmitter transmits the disconnection request to the communication terminal in accordance with the instruction. The transmitter disconnects the communication between the information processing apparatus and the communication terminal in response to receiving a reply to the disconnection request from the communication terminal.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIGS. 10A to 10D are a sequence diagram illustrating an operation of disconnecting a connection between the smart device and the image forming apparatus according to another embodiment of the present invention;

FIGS. 11A to 11D are a sequence diagram illustrating an operation of disconnecting a connection between the smart device and the image forming apparatus according to still another embodiment of the present invention;

FIGS. 12A and 12B are a sequence diagram illustrating an operation of disconnecting a connection between the smart device and the image forming apparatus according to still another embodiment of the present invention.

Figure 1:
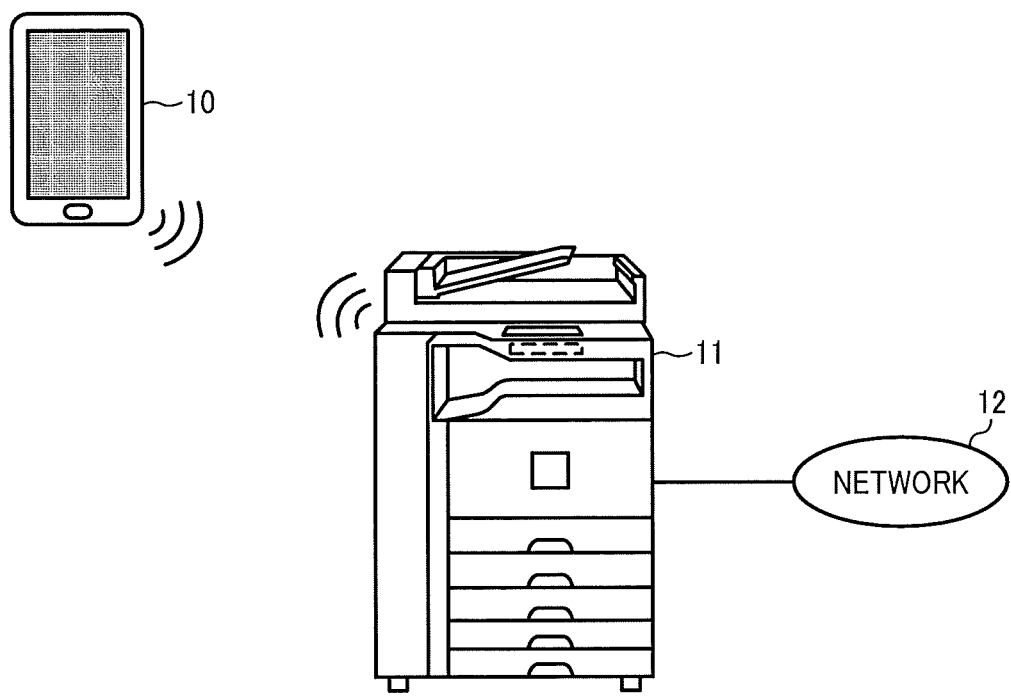
FIG. 1 is a schematic diagram illustrating a configuration of a communication system according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Several exemplary embodiments of the present invention are described hereinafter with reference to drawings.

FIG. 1 is a schematic diagram illustrating a configuration of a communication system according to an embodiment of the present invention. The communication system includes a smart device 10 as an example of a communication terminal and an image forming apparatus 11 as an example of an information processing apparatus that communicates with the smart device 10 via a wireless network. In FIG. 1, the image forming apparatus 11 is connected to a network 12 such as a local area network (LAN) and the Internet. Also in FIG. 1, a single smart device 10 communicates with the image forming apparatus 11 via the wireless network. However, this configuration as illustrated in FIG. 1 is just one example. Alternatively, the image forming apparatus 11 may not be connected to the network 12. Further, the communication system may include two or more smart devices 10. Further, the communication system may include two or more image forming apparatuses 11. The network 12 is implemented by a wired or wireless network. The network 12 is implemented by a single network or two or more networks that are connected to one another via a router, for example.

The smart device 10 includes an application, an operating system (OS), and an application programmable interface (API) for connecting the image forming apparatus 11 via wireless communication and instructing the image forming apparatus 11 to execute a job such as a print job and a scan job. Examples of the smart device 10 include a smartphone, a tablet computer, a smartwatch, a smartglass, a personal digital assistant (PDA). The smartwatch, smartglass and the like are called as a wearable computer, as they are worn on the user's body. Although the description is given of the smart device 10 as an example of the communication terminal, the communication terminal may be a laptop computer or any device that supports a communication function.

The wireless communication may be any one of the infrared communication, the Bluetooth (registered trademark), and the wireless LAN. In this embodiment, a description is given of an example in which the smart device 10 and the image forming apparatus establish a wireless communication link therebetween with the Bluetooth Low Energy (BLE) technology, which was introduced through the Bluetooth Specification v4.0. It should be noted that the Bluetooth may be a personal area network (PAN) wireless medium such as the so-called classic Bluetooth of pre-Bluetooth Specification v3.x.

The BLE is a standard that provides low power usage for communication. The generic access profile (GAP) of Bluetooth Special Interest Group (SIG) defines rules for enabling devices to communicate with one another.

The image forming apparatus 11 receives an instruction for printing or scanning from the smart device 10 via the wireless communication. The image forming apparatus 11 performs printing or scanning an image in accordance with the instruction received from the smart device 10. The image forming apparatus 11 is a printer, a scanner, a facsimile, a copier, or a multifunction peripheral including a printer function, a scanner function, a facsimile function, and a copier function. Although the description is given of the image forming apparatus 11 as an example of the information processing apparatus, the image forming apparatus may be a server, a personal computer, a projector, an electronic white board, a digital camera, and a three-dimensional printer, for example.

The smart device 10 activates an application installed on the smart device 10 in accordance with a user instruction. The application, when executed, enables the user to select an image that the user wants to print or scan and instruct the printing or scanning of the selected image. The smart device 10 establishes a connection with the image forming apparatus 11 via the wireless communication to transmit image data of the image instructed by the user and request the image forming apparatus 11 to print or scan the image. In response to receiving the image data and the request, the image forming apparatus 11 prints out or scans the image data.

After requesting the image forming apparatus 11 to perform printing or scanning and completing all processing to the image forming apparatus 11, the smart device 10 performs processing for automatically disconnecting the connection between the smart device 10 and the image forming apparatus 11. The processing for disconnecting the connection may be performed in accordance with a user instruction to disconnect the communication established between the smart device 10 and the image forming apparatus 11, the user instruction being given after the printing or the scanning is completed. In this case, the smart device 10 and the image forming apparatus 11 perform the processing for disconnecting the connection in response to the user instruction.

Figure 2A:
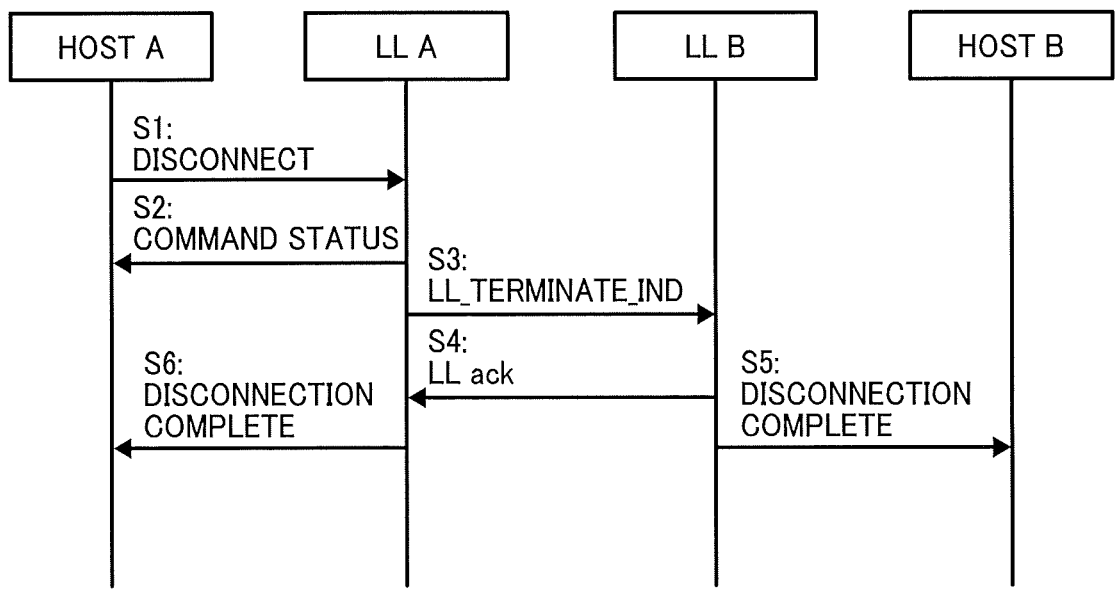
FIGS. 2A and 2B are sequence diagrams, each illustrating an operation of disconnecting a connection between devices that support the Bluetooth.
Figure 2B:
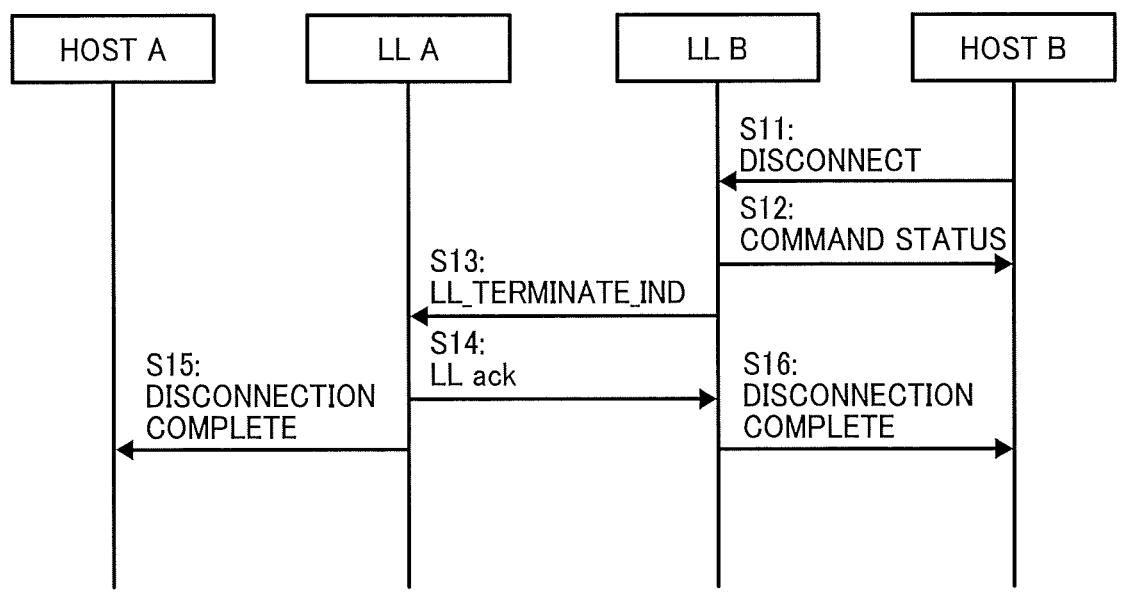

Hereinafter, a description is given of an operation of disconnecting the connection between two devices supporting the Bluetooth with reference to FIGS. 2A and 2B. FIG. 2A is a sequence diagram illustrating an operation performed in a case in which Host A requests the disconnection. The Host A is an application layer, which is an upper layer included in the protocol stack implemented in one device. FIG. 2B is a sequence diagram illustrating an operation performed in a case in which Host B in the protocol stack implemented on the other device communicating with the Host A. In FIGS. 2A and 2B, the one device includes the Host A and a link layer (LL) A, while the other device includes the Host B and a link layer B. The link layers A and B are lower layers of the Host A and the Host B, respectively. For example, the device including the Host A and the link layer A is the smart device 10, while the other device including the Host B and the link layer B is the image forming apparatus 11.

In the processing illustrated in FIG. 2A, the Host A requests the link layer A to disconnect the connection (S1). The link layer A sends back a response indicating a command status to the request (S2). The link layer A transmits an LL_TERMINATE_IND packet as a disconnection request to the link layer B (S3). In response to receiving the disconnection request, the link layer B sends back a response to the link layer A with an LL ack packet (S4). In response to receiving the response, the link layer A disconnects the connection. The link layer B notifies the Host B of the completion of disconnection (S5). The link layer A also notifies the Host A of the completion of disconnection (S6).

In the processing illustrated in FIG. 2B, the Host B requests the link layer B to disconnect the connection (S11). The link layer B responds to the request (S12) with a command status. The link layer B transmits a disconnection request to the link layer A (S13). In response to receiving the disconnection request, the link layer A sends back a response to the link layer B with the LL ack packet (S14). In response to receiving the response, the link layer B disconnects the connection. The link layer A notifies the Host A of the completion of disconnection (S15). The link layer B also notifies the Host B of the completion of disconnection (S16).

When the user using the smart device 10 determines to disconnect the connection between the smart device 10 and the image forming apparatus 11, the user gives an instruction for disconnection to the smart device 10. Accordingly, the processing of disconnecting the connection is performed in accordance with the procedure as illustrated in FIG. 2A. However, when the application implemented on the smart device 10 executes the API, a basic environment (platform) such as the OS or hardware sometimes does not transmit the disconnection request to the image forming apparatus 11 at the intended timing. This is because a manufacturer that develops a platform and a manufacturer that develops software such as the application are different from each other, and therefore the application cannot control the hardware or the protocol stack constituting the platform. In this embodiment, the platform means an information processing terminal that operates on an operating system such as iOS (registered trademark), Android (registered trademark) and Chrome. More specifically, the platform in this embodiment means a functional block having a communication function. For example, iOS discloses the API for allowing a device (a source device) to disconnect the connection with another device (a destination device). However, even when this API is executed, the two devices are kept in connection for about 30 seconds. During this period of time, the destination device cannot be connected to another smart device. Table 1 below indicates, for each command of the BLE, whether the difference between the timing when the API is executed and the timing when a request or data is actually transmitted causes an actual operational problem in the iOS.

TABLE 1

| Command | Meaning | Is Actual Operational problem Caused? |
|---|---|---|
| CONNECT_REQ | Request for connection | No |
| Attribute Write Request | Request for writing | No |
| Attribute Write Response | Response to the request for writing | No |
| Attribute Read Request | Request for reading | No |
| Attribute Read Response | Response to the request for reading | No |
| LL_TERMINATE_IND | Request for disconnection | Yes (Connection status is kept for about 30 seconds) |

As understood from the table, the smart device 10 cannot disconnect the communication link with the image forming apparatus 11 at the timing designated by the application in accordance with the user instruction. As a result, another smart device cannot communicate with the image forming apparatus 11 for some period of time or a long period of time.

Compared with the above-described transmission of the disconnection request, the application layer's original communication such as data exchange is performed at the intended timing of the application. In the communication system disclosed herein, the smart device 10 transmits a certain data item to the image forming apparatus 11 to cause the image forming apparatus 11 to transmit the disconnection request, thereby implementing the disconnection processing as illustrated in FIG. 2B. This configuration and operation of the communication system prevents the time lag as described above from occurring, as the same manufacturer develops the platform and software of the image forming apparatus 11.

Thus, the smart device 10 is able to disconnect the connection at the intended timing. Accordingly, the period of time when the other smart device cannot use the image forming apparatus 11 is shortened.

Figure 3:
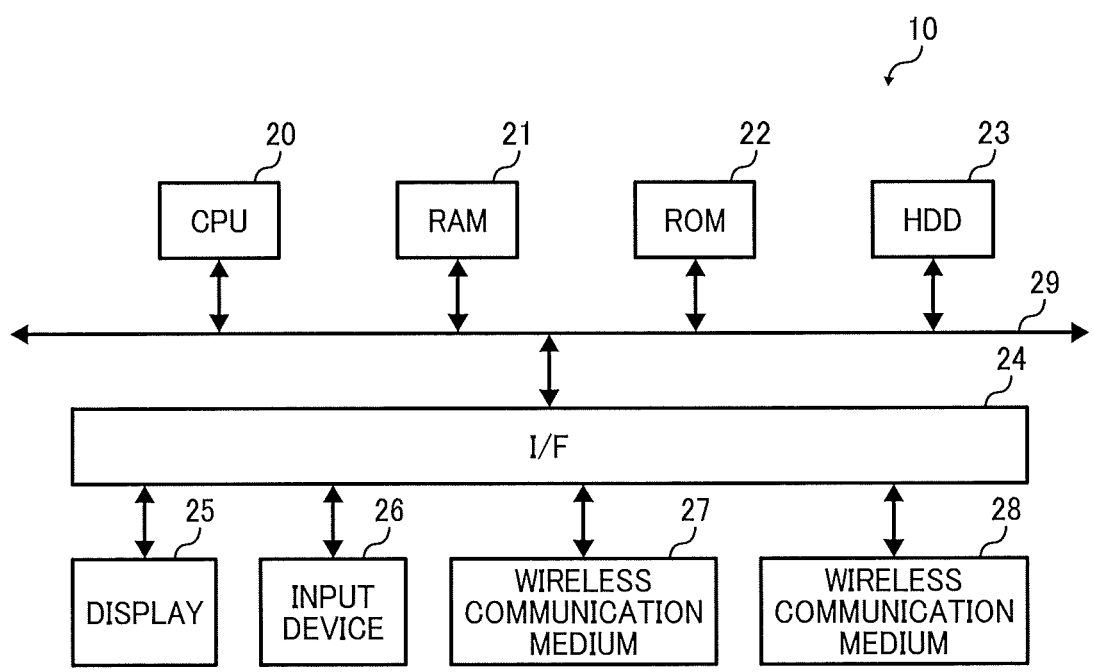
FIG. 3 is a block diagram illustrating a hardware configuration of a smart device as an example of a communication terminal included in the communication system according to an embodiment of the present invention.

Hereinafter, a description is given of hardware configurations and functional configurations of the smart device 10 and the image forming apparatus 11 with reference to FIGS. 3 to 6. FIG. 3 is a block diagram illustrating a hardware configuration of the smart device 10. The smart device 10 has the same or substantially the same configuration as a typical communication terminal such as a smartphone. The smart device 10 includes a central processing unit (CPU) 20, a random access memory (RAM) 21, a read only memory (ROM) 22, a hard disc drive (HDD) 23, an interface (I/F) 24, a display 25, an input device 26, a wireless communication medium 27, and a wireless communication medium 28.

The CPU 20 is a processor, which controls an entire operation of the smart device 10. The RAM 21 is a high-speed read/write volatile storage medium. The CPU 20 uses the RAM 20 as a work area in processing data. The ROM 22 is a read-only non-volatile storage medium that stores programs such as a boot program for starting the smart device 10 and firmware. The HDD 23 is a read/write non-volatile storage medium that stores an OS, various control programs, and application programs.

The I/F 24 connects the bus 29 to various hardware components or a network to control the hardware components and the like. The display 25 is a visual user interface that enables a user to recognize a status of the smart device 10. Example of the display 25 includes a liquid crystal display. The input device 26 is a user interface that enables a user to input information to the smart device 10. Examples of the input device 26 include a keyboard and a mouse. The smart device 10 may include a touch panel that includes the functions of the display 25 and the input device 26.

The wireless communication medium 27 is a Bluetooth transmitter/receiver controllable from the application. The wireless communication medium 28 is a wireless fidelity (Wi-Fi) transmitter/receiver different from the wireless communication medium 27. A wireless medium such as Bluetooth 4.0 is used as the wireless communication medium 27. Alternatively, the wireless communication medium 27 may be a personal area network (PAN) wireless medium such as pre-Bluetooth v3.x, that is, so-called the classic Bluetooth. A wireless medium such as the Wi-Fi in compliance with the institute of electrical and electronics engineers (IEEE) 802.11 standard is used as the wireless communication medium 28.

Figure 4:
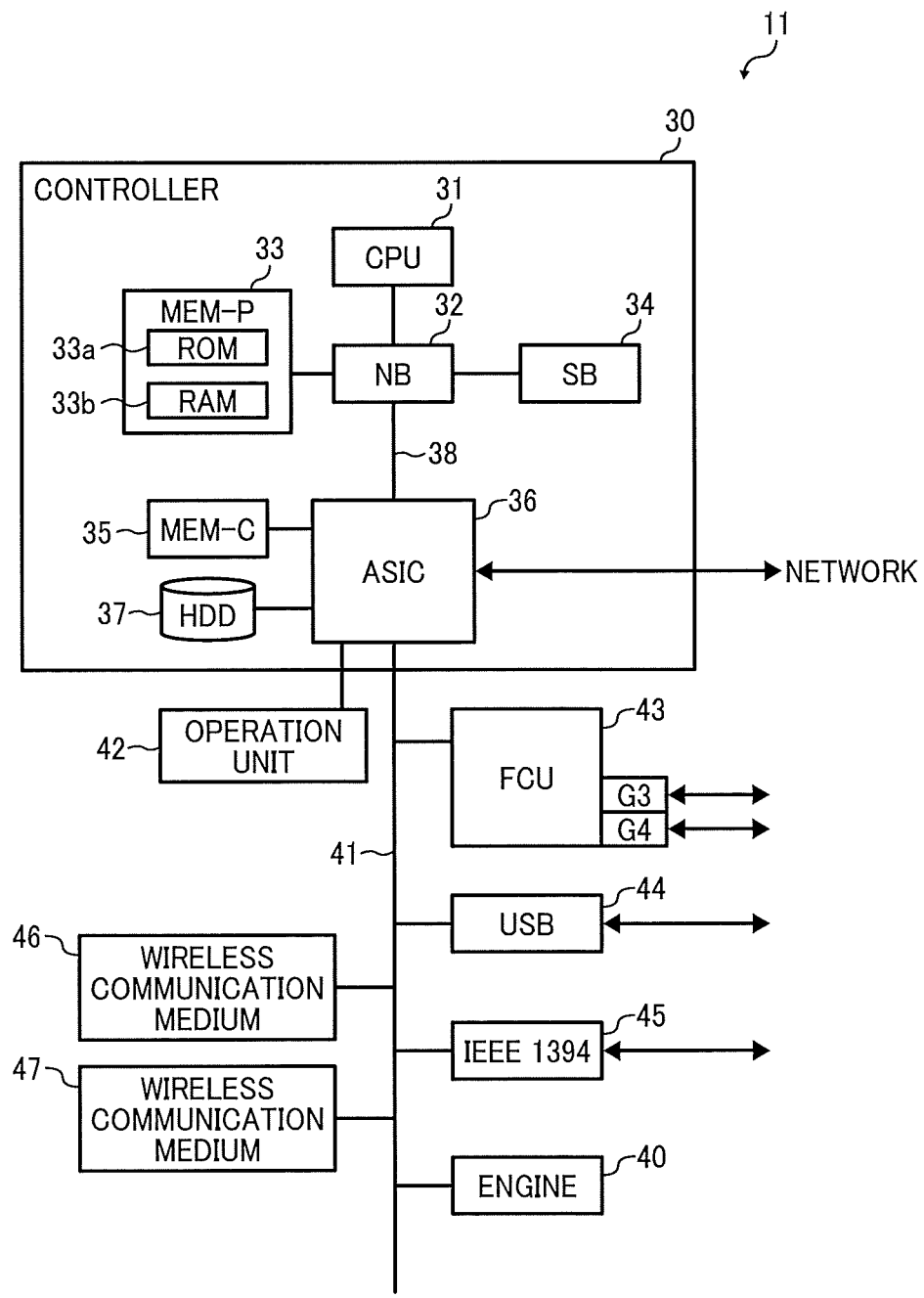
FIG. 4 is a block diagram illustrating a hardware configuration of an image forming apparatus as an example of an information processing apparatus included in the communication system according to an embodiment of the present invention.

FIG. 4 is a block diagram illustrating a hardware configuration of the image forming apparatus 11. The image forming apparatus 11 includes a controller 30 and an engine 40, which are connected with each other via a peripheral component interface (PCI) bus 41. The controller 30 controls an entire operation of the image forming apparatus 11. The controller 30 also controls rendering, communication, and input from an operation unit 42. The engine 40 is a printer engine and the like that can be connected to the PCI bus 41. Examples of the engine 40 include a monochrome plotter, a single-drum color plotter, a four-drum color plotter, a scanner, and a facsimile unit. The engine 40 also includes an image processor that performs error diffusion or gamma conversion and the like in addition to these plotters, etc.

The controller 30 includes a CPU 31, a north bridge (NB) 32, a system memory (MEM-P) 33, a south bridge (SB) 34, and a local memory (MEM-C) 35. The controller further includes an application specific integrated circuit (ASIC) 36 and an HDD 37. The NB 32 and the ASIC 36 are connected via an accelerated graphics port (AGP) bus 38. The MEM-P 33 includes a ROM 33a and a RAM 33b.

The CPU 31 controls an entire operation of the image forming apparatus 11. The CPU 31 is connected to another device via a chip set constituted by the NB 32, the MEM-P 33, and the SB 34. The NB 32 is a bridge for connecting the CPU 31, the MEM-P 33, the SB 34, and the AGP bus 38 to one other. The NB 32 includes a memory controller to control reading and writing data to and from the MEM-P 33, a PCI master, and an AGP target. The PCI master is a device that performs data transfer. The AGP target is a device that receives the data transfer.

The MEM-P 33 is a memory to store programs or data therein. Further, the programs or data stored the MEM-P 33 are read out and loaded to the MEM-P 33. Furthermore, the MEM-P 33 is a memory for drawing used in image drawing processing. The ROM 33a is a read-only memory for storing data. The RAM 33b is a read and write memory used as a memory for data loading and image drawing.

The SB 34 is a bridge to connect the NB 32 with a PCI bus or peripheral devices. The SB 34 is connected to the NB 32 via the PCI bus. The network interface (I/F) and the like are also connected to the PCI bus. The MEM-C 35 is a buffer for temporarily storing image data to be copied. Further, the MEM-C 35 is a buffer for temporarily storing data to be encoded.

The ASIC 36 is an integrated circuit for image processing. The ASIC 36 is a bridge for connecting the AGP bus 38, the PCI bus 41, and the HDD 37, and the MEM-C 35. The ASIC 36 includes a PCI master, an AGP target, an arbiter (ARB) as a core of the ASIC 36, a memory controller for controlling the MEM-C 35, multiple direct memory access controllers (DMACs) for performing rotation and the like of the image data by a hardware logic, and a PCI unit for exchanging data with the engine 40 via the PCI bus 41.

The ASIC 36 is connected to a universal serial bus (USB) 44, an IEEE 1394 interface 45 via the PCI bus 41. Further, the ASIC 36 is connected to a wireless communication medium 46 and a wireless communication medium 47 in the same or substantially the same way as the wireless communication medium 27 and the wireless communication medium 28 of the smart device 10. The wireless communication medium 46 is a wireless medium such as a Bluetooth 4.0 transmitter/receiver controllable from the application. Alternatively, the wireless communication medium 27 may be a personal area network (PAN) wireless medium such as pre-Bluetooth v3.x, that is, so-called the classic Bluetooth. The wireless communication medium 47 is a wireless medium such as the Wi-Fi transmitter/receiver different from the wireless communication medium 46.

The HDD 37 is non-volatile storage medium that stores image data, programs, font data, and forms, for example. The HDD 37 also stores a license file of an application executed by the image forming apparatus 11. Although the controller 30 includes the HDD 37 as an example of a non-volatile storage medium, the controller 30 may include a solid-state drive (SDD). The AGP bus 38 is a bus interface for a graphics accelerator card that is proposed for enhancing the speed of graphic processing. The AGP bus 38 directly accesses the MEM-P33 with high throughput to enhance the speed of the graphics accelerator card.

The operation unit 42 is directly connected to the ASIC 36. The operation unit 42 receives information input by a user oar displays the status of job processing and the like to the user. The operation unit 42 may include a display unit and input keys. Alternatively, the operation unit 42 may be a control panel including a touch panel.

Figure 5:
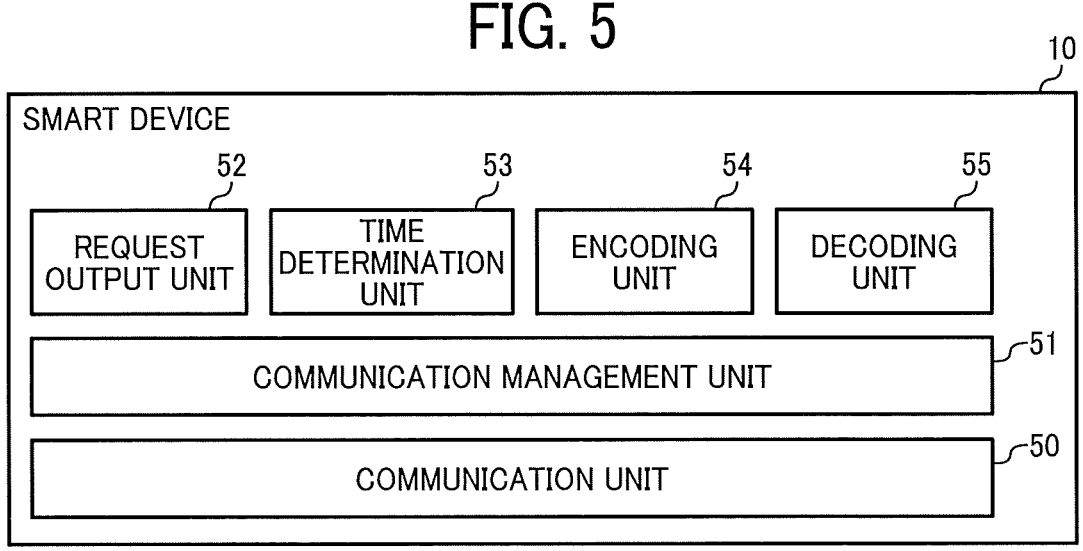
FIG. 5 is a block diagram illustrating a functional configuration of the smart device according to an embodiment of the present invention.

FIG. 5 is a block diagram illustrating functional blocks of the smart device 10. The smart device 10 includes a communication unit 50, a communication management unit 51, a request output unit 52, a time determination unit 53, an encoding unit 54, and a decoding unit 55. The communication unit 50 according to the present embodiment provides a function corresponding to the platform defined in the present disclosure. Each of the request output unit 52, the time determination unit 53, the encoding unit 54, and the decoding unit 55 is implemented by the CPU 20 when executing the application stored in the HDD 23. The communication unit 50 and the communication management unit 51 are implemented by the I/F 24, the wireless communication medium 27, the wireless communication medium 28, and the protocol stack of the wireless communication provided by the platform.

In response to a user instruction, the request output unit 52 outputs a connection request for connecting with the image forming apparatus 11 by a wireless communication. In response to receiving the connection request from the request output unit 52, the communication management unit 51 instructs the communication unit 50 to perform connection process to a device address designated by the connection request.

When the description is given in terms of the BLE, the application layer (host) in the protocol stack of the smart device 10 issues an LE Create Connection command to the link layer. The communication management unit 51 is implement by the host, while the communication unit 50 is implemented by the link layer. In response to receiving the LE Create Connection command from the host, the link layer transmits a CONNECTION_REQ packet as the connection request to the image forming apparatus 11 at the device address. Subsequently, the link layer exchanges connection parameters with the image forming apparatus 11 to establish the connection. When the connection established, the link layer of the smart device 10 notifies the host of an LE Connection Complete event.

The request output unit 52 outputs a read request or a write request for reading or writing data from and to the image forming apparatus 11 while the smart device 10 and the image forming apparatus 11 are in a connection. In response to receiving the read request or the write request from the request output unit 52 via the communication management unit 51, the communication unit 50 performs a procedure specified by the received request.

When the description is given in terms of the BLE, the application executes the API to perform the request process, and the protocol stack executes the procedure specified by the request. Each procedure is to read and write a generic attribute profile (GATT) characteristic value of a GATT service based on a GATT profile. The profile indicates what each device can perform using the Bluetooth. The GATT service is a collection of functions (services) that the image forming apparatus 11 includes. The GATT characteristic value is a value of data constituting the service. In the BLE, the smart device 10 reads and writes the GATT characteristic value from and to the image forming apparatus 11 to perform the communication. The application uses the API of each platform as a subprocedure to implement the reading and writing of the GATT characteristic value of the GATT service.

In the writing and reading of the GATT characteristic values, the data as the value may be encoded or the encoded data may be decoded. Although a communication standard includes an encoding function, the encryption option cannot be utilized especially when the devices communicate with each other without paring. Accordingly, the application performs encoding or decoding. The smart device 10 includes the encoding unit 54 for encoding and decoding, and the decoding unit 55 for decoding. The encoding unit 54 encodes or encrypts data such as the connection request, the read request, and the write request, which are to be transmitted to the image forming apparatus 11. The decoding unit 55 decodes the encrypted data received from the image forming apparatus 11. Any encryption algorithm may be used for the encryption.

The request output unit 52 can output a disconnection request for disconnecting the connection, once the connection has no need to be kept active after the completion of reading/writing the data. The communication unit 50 can receive the disconnection request via the communication management unit 51, and transmit the disconnection request to the image forming apparatus 11. However, in the wireless communication using the Bluetooth, the problem as described above occurs. In other words, the smart device 10 cannot disconnect the communication link with the image forming apparatus 11 at the timing designated by the application in accordance with the user instruction. Accordingly, during a period of time when the smart device 10 is in a communication with the image forming apparatus 11, another smart device cannot communicate with the image forming apparatus 11. To address this problem, the smart device 10 according to the present embodiment outputs and transmits a request as described below instead of the above-described disconnection request.

Specifically, the request output unit 52 outputs a request for transmitting a disconnection request for disconnecting the connection to the smart device 10, once the connection has no need to be kept active. This request is a request for writing, in a specific area of the image forming apparatus 1, a period of time to be measured until the connection is disconnected. For example, the period of time is a numeric value indicating the number of seconds. The period of time is just one example of the information to be written in the specific area of the image forming apparatus 11. Alternatively, the information may be a predetermined instruction for disconnecting the connection immediately. Specifically, in the BLE, the request output unit 52 requests to write the period of time or the instruction to a predetermined GATT characteristic of the image forming apparatus 11. Note that the instruction may be written to any other area such as the GATT Descriptor. The GATT characteristic is present in a database called the GATT service that the application includes in association with the GATT profile used in the BLE, and the values is stored as data. The communication unit 50 transmits the write request for requesting writing of the period of time, etc., to the image forming apparatus 11 to cause the image forming apparatus 11 to write the period of time, etc.

The communication unit 50 receives the disconnection request from the image forming apparatus 11 when the period of time written in accordance with the write request has passed or immediately without measuring the period of time. The communication unit 50 sends back the response to the disconnection request. Specifically, in the BLE, the image forming apparatus 11 transmits the LL_TERMINATE_IND packet as the disconnection request. In response to receiving this packet from the image forming apparatus 11, the link layer of the protocol stack sends back the LL ack packet. Subsequently, the link layer notifies the host of a Disconnection Complete event, and the disconnection processing ends. Thus, the communication unit 50 notifies the communication management unit 51 of the completion of the disconnection processing.

The time determination unit 53 predicts a period of time when the smart device communicates with the image forming apparatus 11. Based on the prediction, the time determination unit 53 determines the period of time to be specified by the write request output by the request output unit 52. For example, in a case in which the smart device 10 communicates with the image forming apparatus 11 for three times and 3 seconds per time, the time determination unit 53 predicts the period of time from the writing of the period of time till the disconnection is 9 seconds (3*3=9). Thus, the time determination unit 53 determines the period of time to be specified in the write request is 9 seconds or 10 seconds providing an allowance of 1 second. The value to be written is either 9 seconds or 10 seconds. However, it is preferable to add an arbitrary extra time (1 second, in this example) to the value to make it sure that the connection is disconnected after the smart device 10 communicates with the image forming apparatus for three times.

The time determination unit 53 predicts the period of time when the smart device communicates with the image forming apparatus 11 as a period of time necessary for reading and writing to be performed thereafter. Further, the time determination unit 53 determines the number of times of the communications based on the number of times the reading and writing is to be performed. Furthermore, the time determination unit 53 obtains an average of the periods of time for the communication based on the past communication history to predict the period of time required for one communication. Note that the above-described prediction of the period of time is just one example, and the period of time may be predicted in any other desired manner. In addition, although the description is given of an example in which one second is added as the arbitrary extra time, any other extra time such as 0.5 seconds or 2 seconds may be added.

The request output unit 52 generates the write request for requesting writing of the period of time determined by the time determination unit 53 and outputs the write request. In addition, there is a case that, after the communication unit 50 transmits the write request to the image forming apparatus 11, the smart device 10 wishes to change the period of time. For example, the smart device 10 wishes to disconnect the connection immediately, although the write request indicates 10 seconds to disconnect the connection after the smart device 10 communicates with the image forming apparatus for three times.

In this case, the request output unit 52 outputs a cancel request for canceling the disconnection request to be transmitted from the image forming apparatus 11 when the period of time specified by the write request has passed. The cancel request is a request for writing a numeric value as cancellation information in a specific area of the image forming apparatus 11 in the same or substantially the same manner as the write request. This numeric value may be any value except for a numeric value that can be measured as a specified period of time. If such numeric value is written, a period of time cannot be measured. For example, the value as the cancellation information is zero or a negative value such as −1. Further, the value as the cancellation information may be written in the same specific area in which the numeric value indicating the period of time to be measured has been written to overwrite the numeric value. Note that, the instruction for disconnecting the connection immediately as described above is implemented by writing the value of zero, the cancellation information is implemented by the negative value.

Figure 6:
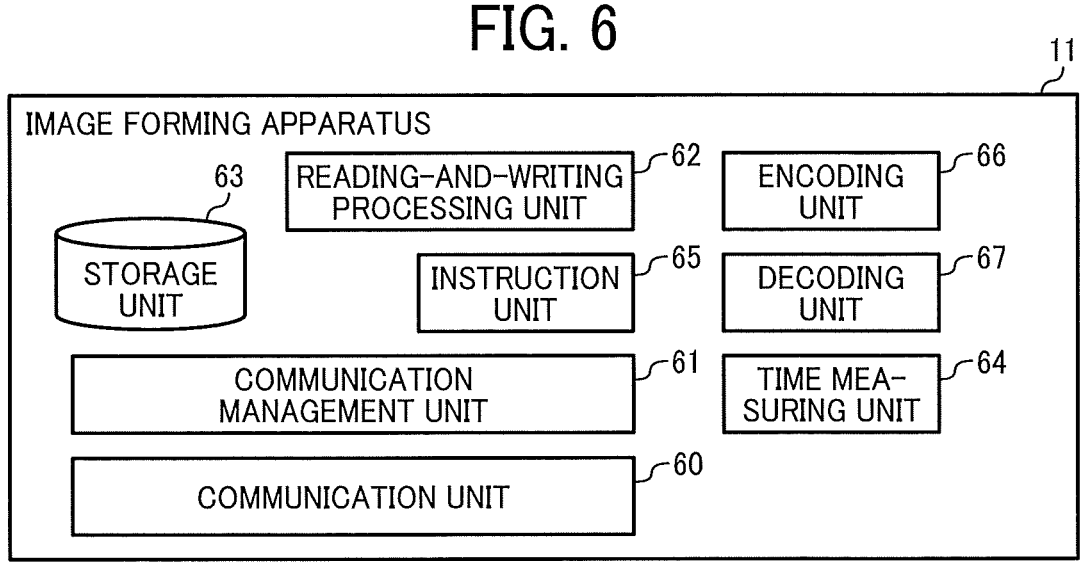
FIG. 6 is a block diagram illustrating a functional configuration of the image forming apparatus according to an embodiment of the present invention.

FIG. 6 is a block diagram illustrating functional blocks of the image forming apparatus 11. The image forming apparatus 11 includes a communication unit 60, a communication management unit 61, a reading-and-writing processing unit 62, a storage unit 63 as the database, a time measuring unit 64, and an instruction unit 65. The communication unit 60 provides a function corresponding to the platform defined in the present disclosure. The communication unit 60 receives the write request of the period of time, etc., and passes the write request to the reading-and-writing processing unit 62 via the communication management unit 61.

Although, in an example illustrated in FIG. 6, the communication unit 60 also functions as a request reception unit that receives the write request, the request reception unit may be implemented by a separate functional block. The reading-and-writing processing unit 62 stores, in a specific area of the storage unit 63, the requested period of time or the instruction as information relating to the transmission of the disconnection request. Subsequently, the reading-and-writing processing unit 62 notifies the instruction unit 65 of the completion of the writing. Hereinafter, a description is given of an example in which the reading-and-writing processing unit 62 writes only the period of time in the specific area of the storage unit 63.

In response to receiving an instruction from the instruction unit 65, the time measuring unit 64 refers to the period of time stored in the specific area of the storage unit 63 and starts measuring time. When the time measured by the time measuring unit 64 reaches the period of time stored in the specific area, the time measuring unit 64 notifies the instruction unit 65 that the period of time stored in the specific area has passed. In response to receiving this notification from the time measuring unit 64, the instruction unit 65 generates the disconnection request for disconnecting the connection with the smart device 10. Further, the instruction unit 65 instructs the communication management unit 61 to transmit the disconnection request. In response to receiving this instruction from the instruction unit 65, the communication management unit 61 instructs the communication unit 60 to transmit the disconnection request. The communication unit 60 transmits the disconnection request to the smart device 10.

In response to receiving the disconnection request from the communication unit 60, the smart device 10 sends back a response to the communication unit 60. In response to receiving the response from the smart device 10, the communication unit 60 performs processing for disconnecting the communication link with the smart device 10. In the processing for disconnecting the communication link, for example, the communication unit 60 abandons the connection parameters exchanged with the smart device 10 when establishing the connection.

Specifically, in the BLE, in response to receiving a CONNECT_REQ packet as the connection request from the smart device 10, the protocol stack of the image forming apparatus 11 exchanges the connection parameters with the smart device 10 to establish the connection. When the connection is established, the link layer notifies the host of the LE Connection Complete event. The host sends the notification to the application via the API. Further, in response to receiving the request for reading and writing data from and to the smart device 10, the protocol stack reads and writes the data, via the API, to and from the database that the application includes. In the BLE, the GATT characteristic value is read and written from and to the database. When the reading and the writing of data ends, the protocol stack sends back a GATT Characteristic Read/Write Response to notify the smart device 10 of the result of the reading and writing.

In the reading and the writing of data, the data may be encoded. Accordingly, the image forming apparatus 11 further includes an encoding unit 66 that encodes the read-out data to be transmitted to the smart device 10. Furthermore, the image forming apparatus 11 includes a decoding unit 67 that decodes the encoded data transmitted from the smart device 10.

In a case in which the disconnection request is transmitted from the smart device 10, the protocol stack sends back the disconnection response to the smart device 10. Subsequently, the protocol stack notifies the application of the completion of the disconnection via the API.

Specifically, the smart device 10 transmits the LL_TERMINATE_IND packet to the protocol stack. In response to receiving the packet, the link layer of the protocol stack transmits the LL ack packet to the smart device 10. Subsequently, the link layer notifies the host of the LE Disconnection Complete event. The host notifies the application of the completion of the disconnection via the API, and the disconnection process ends.

The disconnection process is performed as described above in a case in which the smart device 10 transmits the disconnection request. However, the disconnection request is sometimes not transmitted to the protocol stack of the image forming apparatus 11 immediately depending on the platform. To address such situation, the smart device 10 transmits the write request for requesting writing of the period of time in disconnecting the connection. The image forming apparatus 11 writes the period of time in the predetermined area in accordance with the write request. Further, the image forming apparatus 11 measures the written period of time with a timer. When a period of time measured by the timer reaches the written period of time, the image forming apparatus 11 executes the API for disconnection process to cause the protocol stack to transmit the disconnection request to the smart device 10. Specifically, the link layer of the protocol stack transmits the LL_TERMINATE_IND packet to the smart device 10.

In response to receiving the LL ack packet from the smart device 10, the link layer of the protocol stack notifies the host of the LE Disconnection Complete event. The host notifies the application of the completion of the disconnection via the API, and the disconnection process ends.

Hereinafter, a description is given of a case in which, after the timer starts measuring time, the smart device 10 transmits the cancel request for writing the value indicating the cancellation in the specific area. The writing of the value indicating the cancellation invalidates the disconnection process that is to be executed when the time measured by the timer reaches the period of time written in the specific area. Thus, the smart device 10 cancels the disconnection process to be performed by writing the value indicating the cancellation in the specific area. In addition, a new period of time is set by writing a new value after the cancellation.

Figure 7:
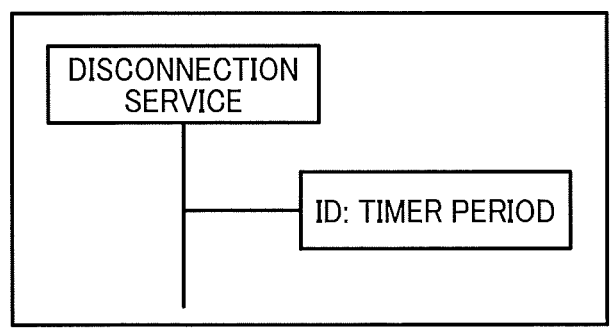
FIG. 7 is a schematic diagram illustrating a configuration of a database for a disconnection process that the image forming apparatus has according to an embodiment of the present invention.

Hereinafter, with reference to FIG. 7, a description is given of the database implemented by the storage unit 63 to which the reading-and-writing processing unit 62 writes data. In the BLE, the GATT service contains multiple GATT characteristics to define properties and operations. In the present embodiment, the GATT service is defined as a specific disconnection service illustrated in FIG. 7. Each of multiple characteristics has an identifier (ID) as its value. Although, in fact, the GATT characteristic includes a value, properties indicating operations, permissions indicating authorities, etc., FIG. 7 illustrates the value as one logical unit.

When the smart device 10 requests the disconnection to the image forming apparatus 11, the application of the smart device 10 is required to write an appropriate value in the database. Accordingly, as illustrated in FIG. 7, the ID and a timer period, which can be divided into multiple GATT characteristics, is defined as a single GATT characteristic. The ID and the timer period are defined as the single GATT characteristic, because if they are divided into multiple GATT characteristics, the write process is to be executed for multiple times, causing the long communication time and the slow communication speed. Note that, in a case in which the communication speed and the communication time present no problem, the ID and the timer period are defined as different GATT characteristics.

Note that, the ID is determined as a unique value obtained with a hash function and the like of the smart device 10 when the smart device 10 requests the disconnection process. This value is used for determining which disconnection process is to be canceled, in canceling the disconnection process. Note that the timer period is the period of time to be measured until the start of the disconnection process, the period of time being written when the smart device 10 requests the disconnection process.

Figure 8A:
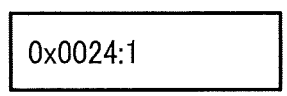
FIGS. 8A to 8C are diagrams, each illustrating an example of information written in the database illustrated in FIG. 7.
Figure 8B:
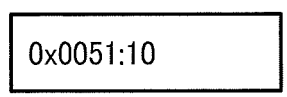
Figure 8C:
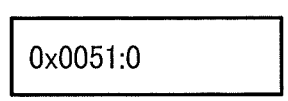

Hereinafter, a description is given of specific examples of the value written in the database with reference to FIGS. 8A to 8C. In FIGS. 8A to 8C, the ID is an identification information for identifying the timer. In FIG. 8A, a value of 1 is written in association with the ID of 0x0024, which requests that the disconnection process is started when the time measured by the timer having the ID of 0x0024 reaches 1 second. In FIG. 8B, a value of 10 is written in association with the ID of 0x0051, which requests that the disconnection process is started when the time measured by the timer having the ID of 0x0051 reaches 10 seconds.

In FIG. 8C, a value of 0 is written in association with the ID of 0x0051, which requests the cancellation of the disconnection to the same timer having the ID of 0x0051. The value of zero is a value for invalidating measurement by the timer. Note that, in a case in which the value of zero is written as data for transmitting the disconnection request immediately, a negative value is used as a value for invalidating the measurement by the timer.

Hereinafter, a description is given of an operation of disconnecting the connection between the smart device 10 and the image forming apparatus 11 performed by the communication system with reference to a sequence diagram of FIGS. 9A and 9B. The following description is given based on a command specification of the BLE. A description is given of an example in which the smart device 10 includes the communication unit 50, the communication management unit 51, and the request output unit 52, and the image forming apparatus 11 includes the communication unit 60, the communication management unit 61, the reading-and-writing processing unit 62, the time measuring unit 64, and the instruction unit 65.

In response to receiving a user instruction for disconnecting the connection, for example, the request output unit 52 generates the write request for requesting writing of the period of time determined by the time determination unit 53. Further, the request output unit 52 transmits the write request to the communication management unit 51 (S101). The communication management unit 51 outputs the received write request as a GATT characteristic Write Request command to the communication unit 50 (S102). The communication unit 50 converts the GATT characteristic Write Request command into an Attribute Write Request packet and transmits the Attribute Write Request packet to the image forming apparatus 11 (S103). Note that, in a case in which a maximum transmission unit (MTU) as a maximum data amount that can be transferred once is set small with the connection parameter, the packet is divided into multiple segments for transmission. In this case, a receiver combines the multiple segments to restore the packet.

In the image forming apparatus 11, the communication unit 60 receives the Attribute Write Request packet and converts the Attribute Write Request packet into a GATT characteristic Write Request command, which is the abstract Attribute Write Request packet. Further, the communication unit 60 outputs the GATT characteristic Write Request command to the communication management unit 61 (S104). The communication management unit 51 outputs the GATT characteristic Write Request command as the write request to the reading-and-writing processing unit 62 (S105). The reading-and-writing processing unit 62 stores, in the specific area of the storage unit 63, the period of time specified by the write request (S106). Subsequently, the reading-and-writing processing unit 62 notifies the instruction unit 65 of the completion of writing of the period of time (S107). The instruction unit 65 instructs the time measuring unit 64 to start measuring time (S108). In response to receiving the instruction, the time measuring unit 64 starts measuring time (S109).

The reading-and-writing processing unit 62 also notifies the communication management unit 61 of the completion of writing of the period of time (S110). The communication management unit 61 sends back a GATT Characteristic Write Response event indicating the completion of writing to the communication unit 60 (S111). The communication unit 60 converts GATT Characteristic Write Response event into an Attribute Write Response packet and transmits the Attribute Write Response packet to the smart device 10 (S112).

The communication unit 50 receives the Attribute Write Response packet from the image forming apparatus 11. Further, the communication unit 50 converts the Attribute Write Response packet into a GATT Characteristic Write Response event and transmits the GATT Characteristic Write Response event to the communication management unit 51 (S113). The communication management unit 51 transmits the GATT Characteristic Write Response event as a write result to the request output unit 52 (S114). The request output unit 52 displays the write result on the display 25, for example, to notify the user of the result.

When the time measured by the time measuring unit 64 reaches the period of time written in the storage unit 63, the time measuring unit 64 notifies the instruction unit 65 that the time measuring unit 64 measures the period of time (S115). The instruction unit 65 generates the disconnection request for disconnecting the connection with the smart device 10. Further, the instruction unit 65 outputs the disconnection request to the communication management unit 61 to instruct the disconnection (S116). The communication management unit 61 outputs the disconnection request as a LE_Disconnect command to the communication unit 60 (S117). The communication unit 60 converts the LE_Disconnect command into the LL_TERMINTE_IND packet and transmits the LL_TERMINATE_IND packet to the smart device 10 (S118).

In response to receiving the LL_TERMINTE_IND packet, the communication unit 50 of the smart device 10 sends back the LL ack packet as a reply (S119). In response to receiving the LL ack packet, the communication unit 60 of the image forming apparatus 11 converts the LL ack packet to the LE_Disconnection Complete event. Further, the communication unit 60 outputs LE Disconnection Complete event to the communication management unit 61 (S120). The communication management unit 61 transmits, to the instruction unit 65, the LE Disconnection Complete event as a notification indicating the completion of the disconnection (S121).

The communication unit 50 converts the LL_TERMINATE_IND packet received from the image forming apparatus 11 into the LE Disconnection Complete event and outputs the LE Disconnection Complete event to the communication management unit 51 (S122). The communication management unit 51 outputs, to the request output unit 52, the LE Disconnection Complete event as a notification indicating the completion of the disconnection (S123).

Figure 9A:
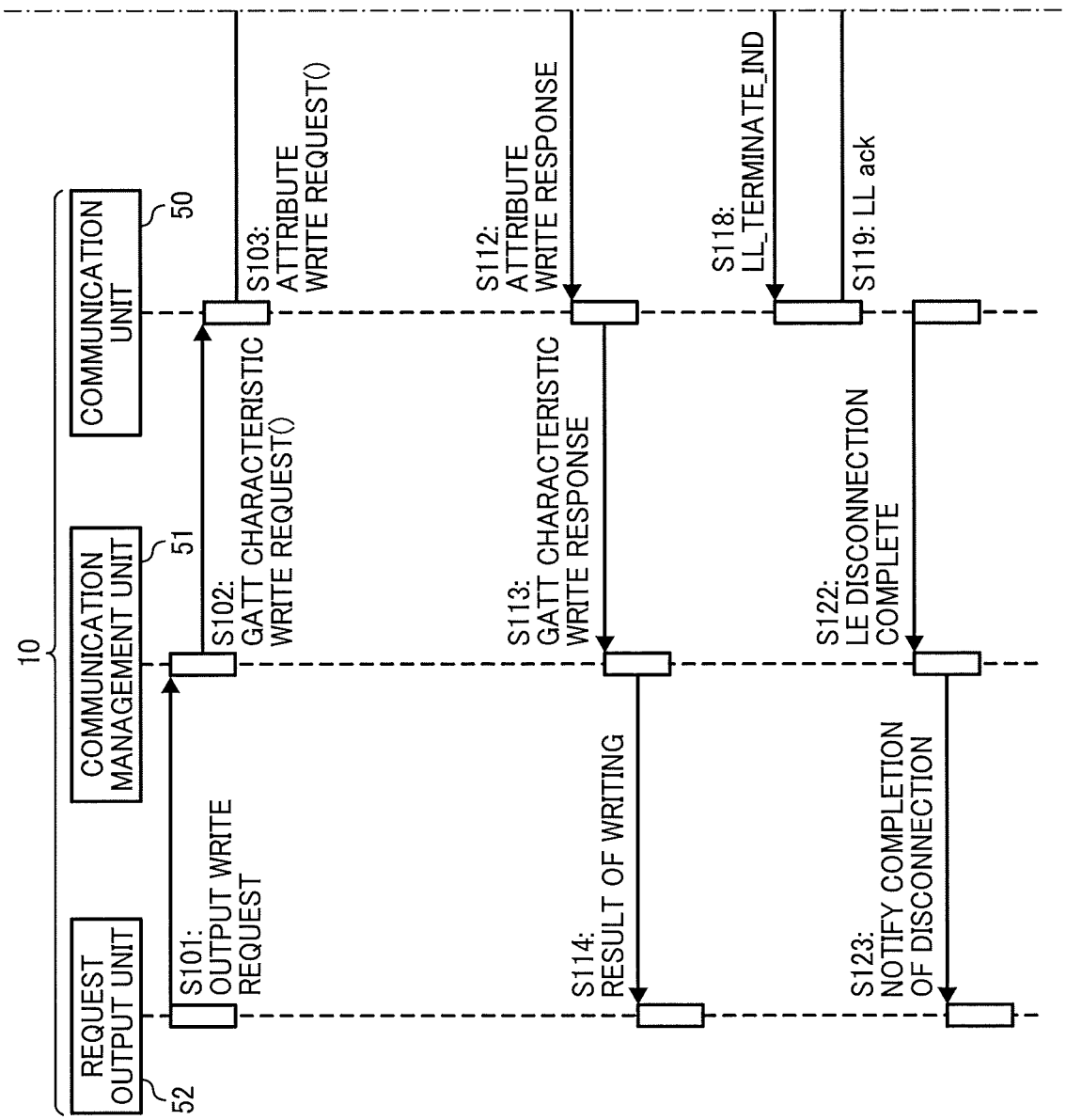
FIGS. 9A and 9B are a sequence diagram illustrating an operation of disconnecting a connection between the smart device and the image forming apparatus according to an embodiment of the present invention.
Figure 9B:
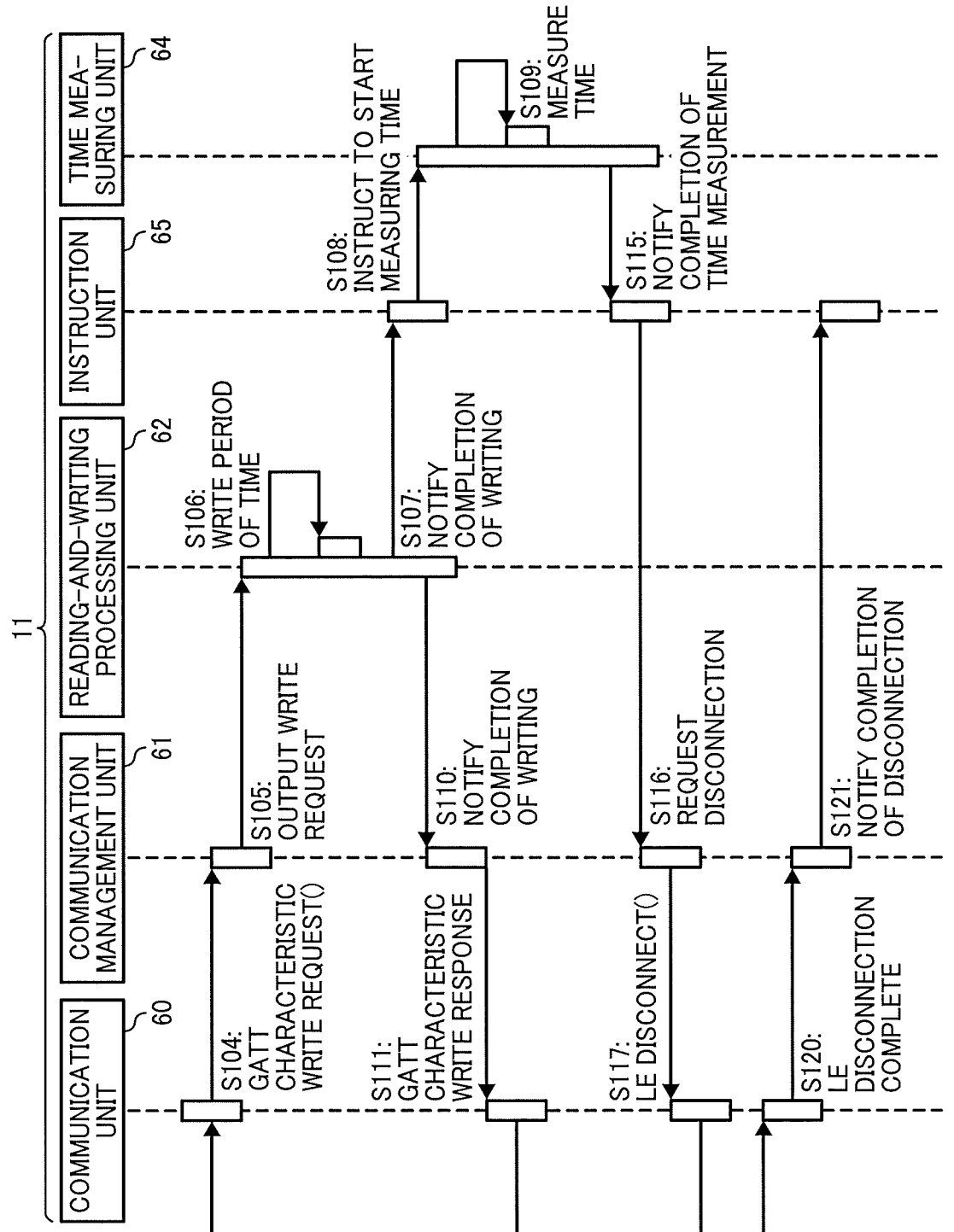
Figure 10B:
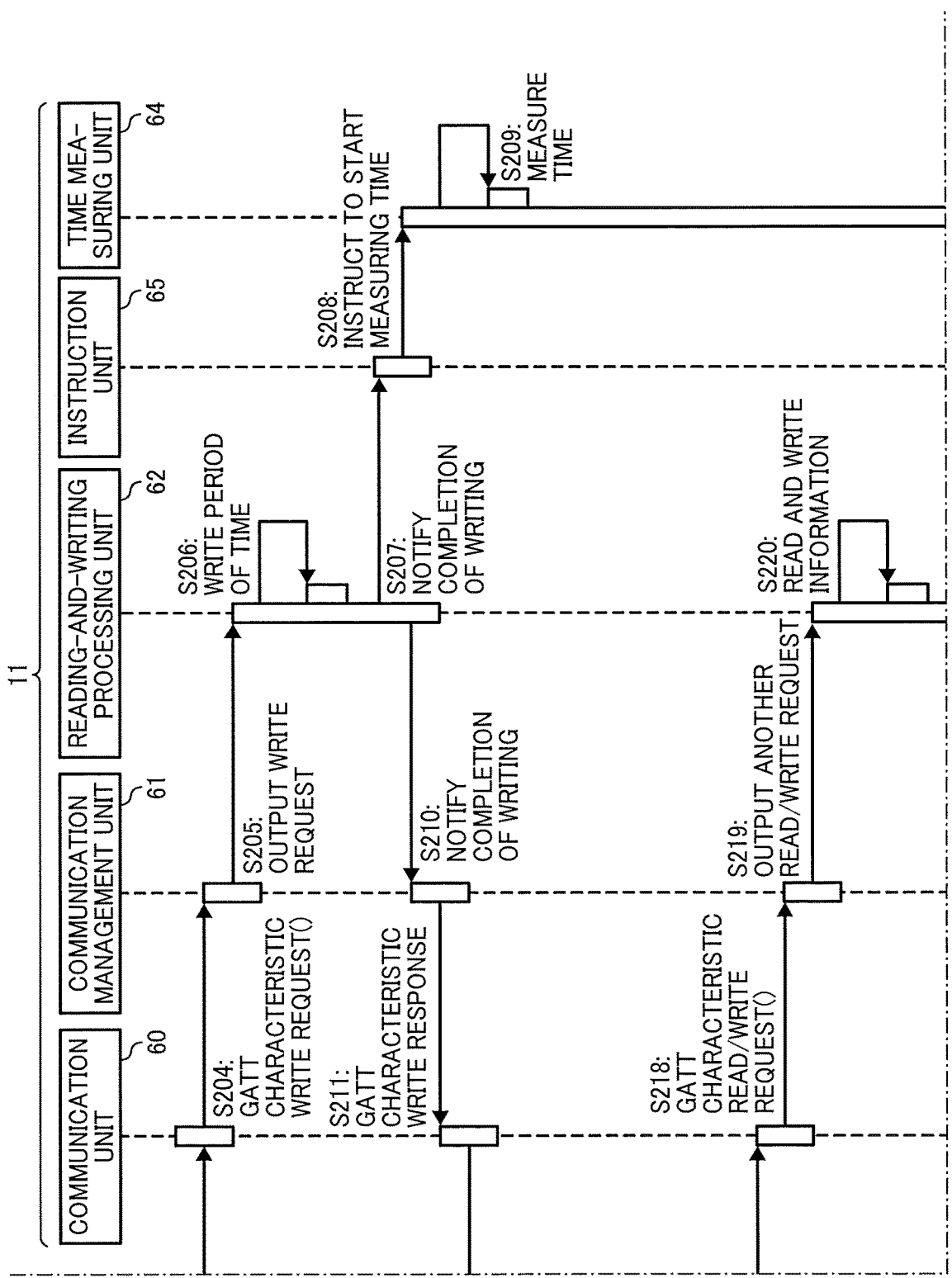
Figure 10C:
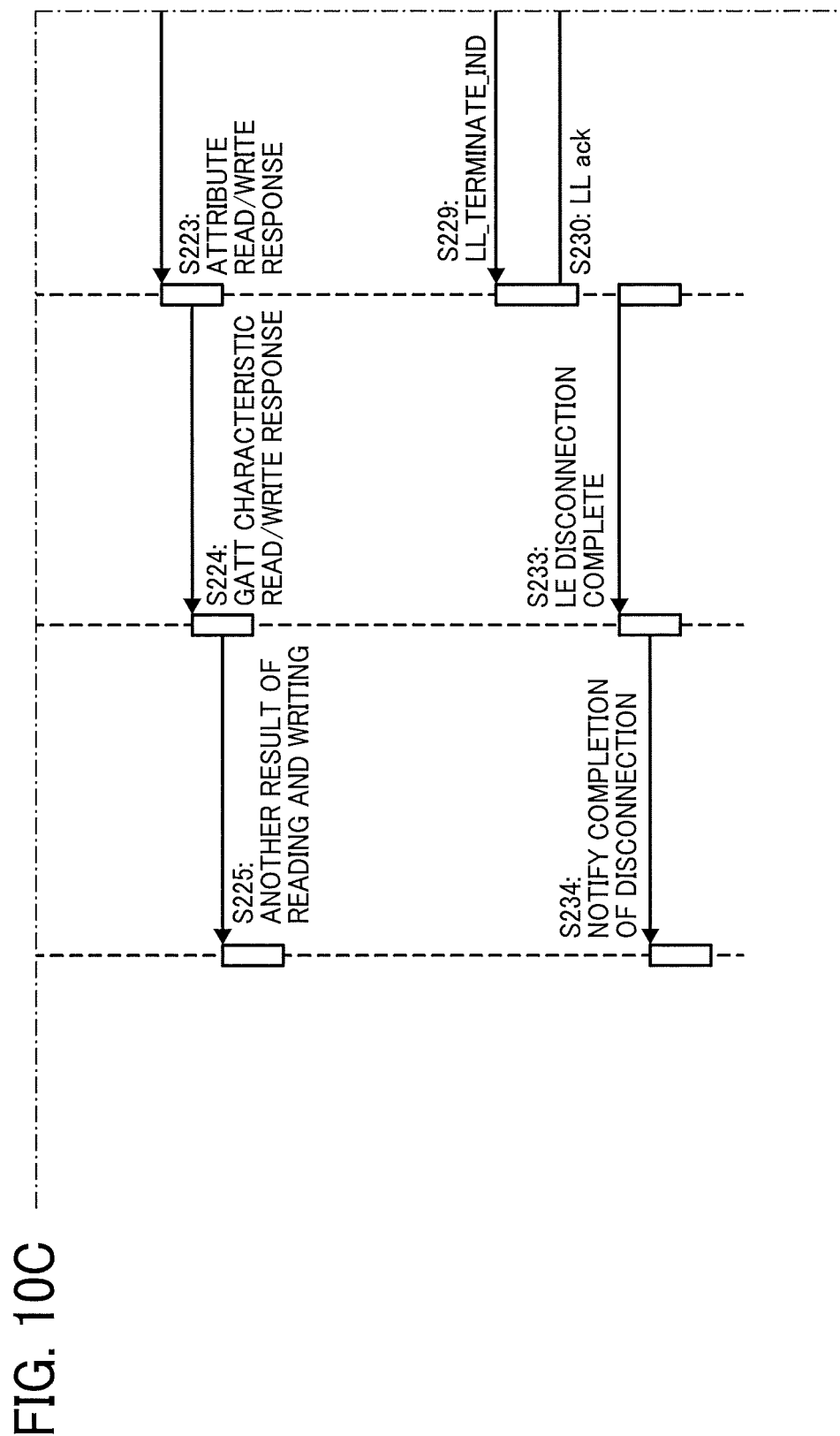
Figure 10D:
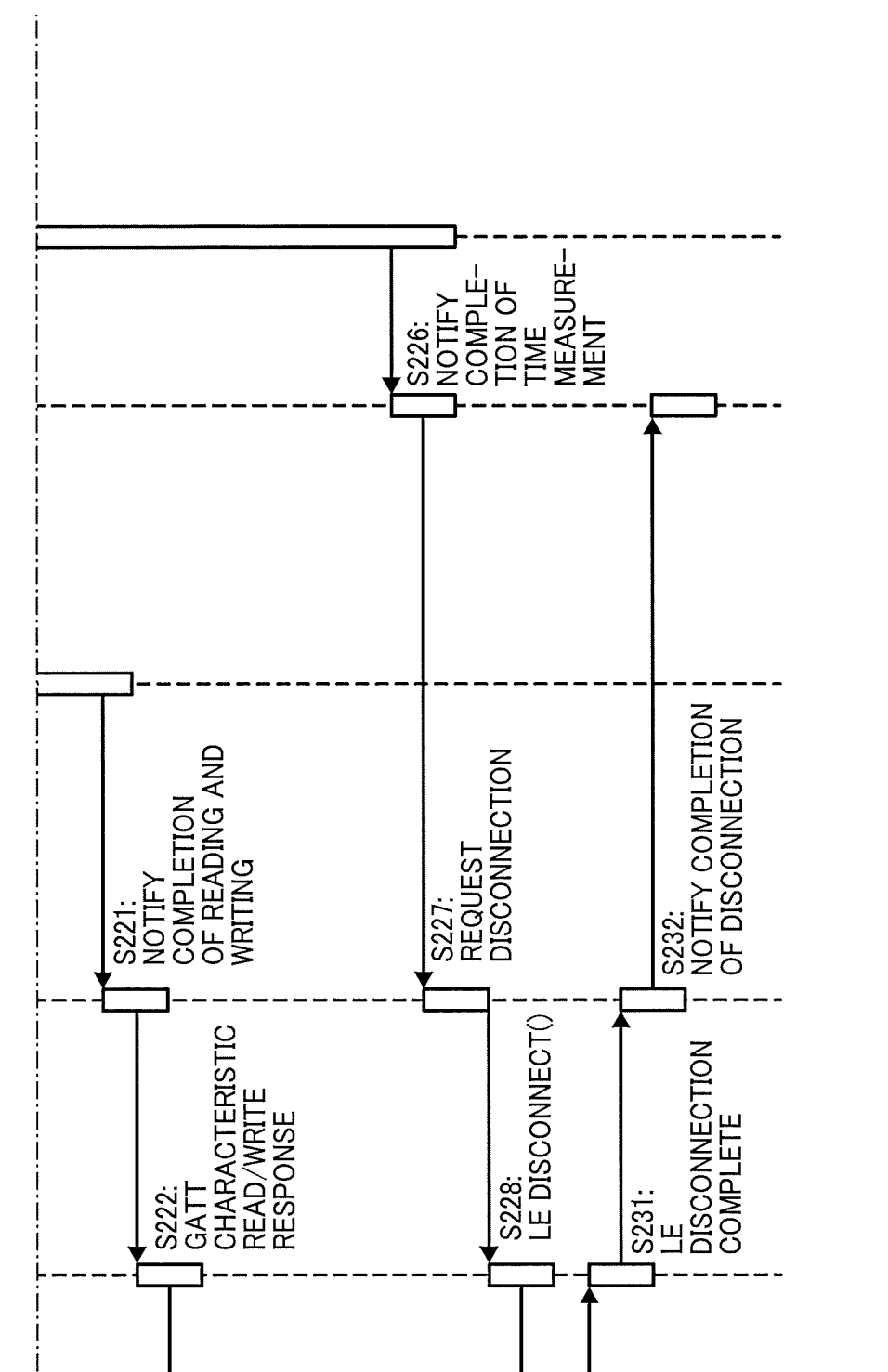
Figure 11B:
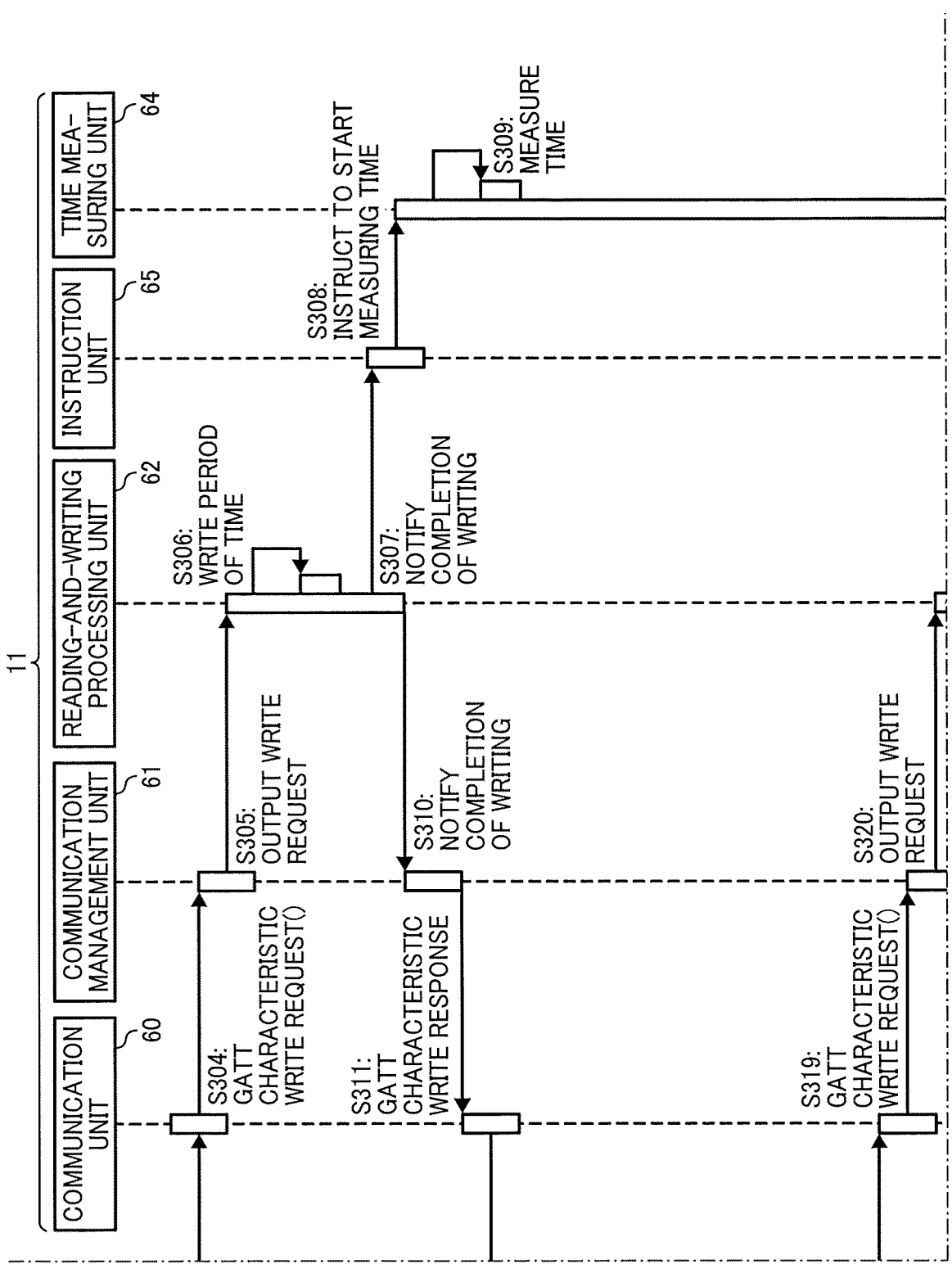
Figure 11C:
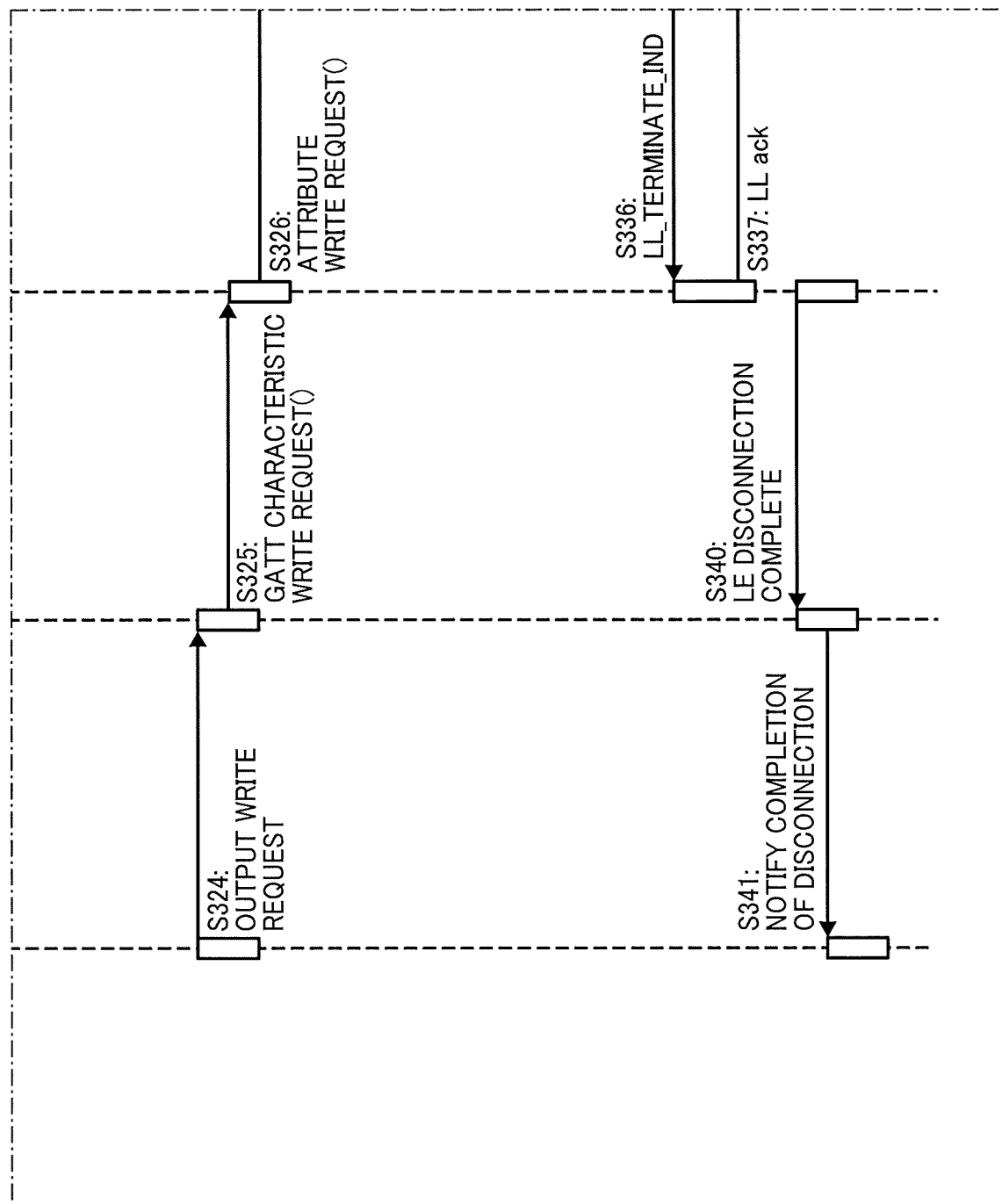
Figure 11D:
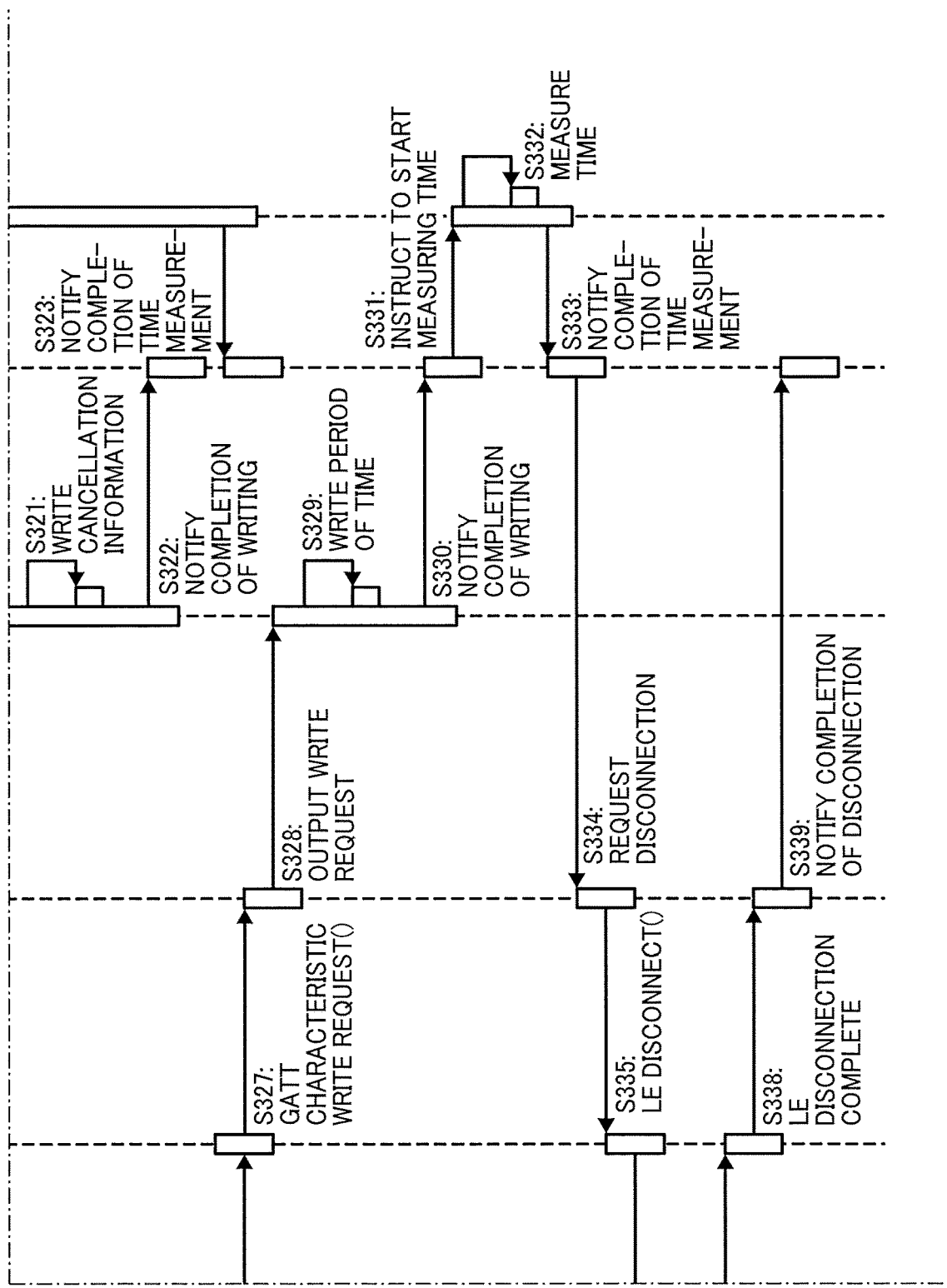

The operation illustrated in FIGS. 9A and 9B is performed when the period of time written in the storage unit 63 is short. FIGS. 10A to 10D is a sequence diagram illustrating an operation performed by the smart device 10 and the image forming apparatus 11 when the period of time written in the storage unit 63 is long. For example, the period of time written in the storage unit 63 is 10 seconds. The operation illustrated in FIGS. 10A to 10D different from that of FIGS. 9A and 9B in that another writing process is inserted, as a certain period of time is available until the output of the disconnection request. Operations of S201 to S214 are the same or substantially the same as those of S101 to S114 of FIGS. 9A and 9B, and the description thereof is omitted. The other writing process is performed after the request output unit 52 receives the write result at S214.

Specifically, the request output unit 52 outputs another read/write request (S215). The communication management unit 51 outputs the received read/write request as a GATT characteristic Read/Write Request command to the communication unit 50 (S216). The communication unit 50 converts the GATT characteristic Read/Write Request command into an Attribute Read/Write Request packet and transmits the Attribute Read/Write Request packet to the image forming apparatus 11 (S217).

In the image forming apparatus 11, the communication unit 60 receives the Attribute Read/Write Request packet and converts the Attribute Read/Write Request packet into a GATT characteristic Read/Write Request command, which is the abstract Attribute Read/Write Request packet. Further, the communication unit 60 outputs the GATT characteristic Read/Write Request command to the communication management unit 61 (S218). The communication management unit 61 outputs the GATT characteristic Read/Write Request command as the read/write request to the reading-and-writing processing unit 62 (S219). The reading-and-writing processing unit 62 reads or writes data specified the read/write request from or to the storage unit 63 (S220). The reading-and-writing processing unit 62 also notifies the communication management unit 61 of the completion of reading and writing (S221). The communication management unit 61 sends back a GATT characteristic Read/Write Response event indicating the completion of reading and writing to the communication unit 60 (S222). The communication unit 60 converts the GATT characteristic Read/Write Response event into an Attribute Read/Write Response packet and transmits the Attribute Read/Write Response packet to the smart device 10 (S223).

The communication unit 50 receives the Attribute Read/Write Response packet from the image forming apparatus 11. Further, the communication unit 50 converts the Attribute Read/Write Response packet into a GATT characteristic Read/Write Response event and transmits the GATT Characteristic Read/Write Response event to the communication management unit 51 (S224). The communication management unit 51 transmits the GATT characteristic Read/Write Response event as a write result to the request output unit 52 (S225). The request output unit 52 displays the write result on the display 25, for example, to notify the user of the result.

In the embodiment illustrated in FIGS. 10A to 10D, after the time measured by the time measuring unit 64 reaches the period of time written in the storage unit 63, the operations of S226 to S234 are performed in the same or substantially the same manner as S115 to S123 of FIGS. 9A and 9B. As described heretofore, the period of time written in the storage unit 63 is variable, and the read/write process from the smart device 10 to the image forming apparatus 11 is performed while the time measuring unit 64 measures time. Accordingly, the period of time is set depending on the number of times the smart device 10 communicates with the image forming apparatus 11. Further, the period of time until the start of the disconnection process is controlled in a case in which the smart device 10 cannot communicate with the image forming apparatus 11 due to any trouble.

Hereinafter, a description is given of an operation of writing the period of time from the smart device 10, canceling the writing, and rewriting the period of time with reference to FIGS. 11A to 11D. The smart device 10 overwrites the value indicating the period of time that has been written in the specific area of the storage unit 63 with an invalid value before the period of time passes to cancel the disconnection process that is to be executed when the time measured by the time measuring unit 64 reaches the period of time written in the specific area. The image forming apparatus 11 refers to the GATT characteristic value, and finds that the GATT characteristic value is not a predetermined value, the image forming apparatus 11 does not perform the disconnection process. Thus, the disconnection process is canceled, and the predetermined value is rewritten to perform the disconnection process. For example, after the smart device 10 has output the request for performing the disconnection process in 10 seconds, when the error occurs in the smart device 10 and the smart device 10 wants the image processing apparatus 11 to perform the disconnection process immediately, the smart device 10 cancels the request that has been output and outputs the request again. Thus, the connection is disconnected without waiting the previous request.

Operations of S301 to S314 are the same or substantially the same as those of S101 to S114 of FIGS. 9A and 9B, and the description thereof is omitted. As illustrated in FIG. 11A, an error occurs in the smart device 10 (S315). In order to cancel the request based on which the disconnection process is to be performed when the time measured by the time measuring unit 64 reaches the period of time written in the storage unit 63, the request output unit 52 generates the write request for requesting writing of the invalid value as the cancellation information and output the write request to the communication management unit 51 (S316). The communication management unit 51 outputs the received write request as the GATT characteristic Write Request command to the communication unit 50 (S317). The communication unit 50 converts the GATT characteristic Write Request command into the Attribute Write Request packet and transmits the Attribute Write Request packet to the image forming apparatus 11 (S318).

In the image forming apparatus 11, the communication unit 60 receives the Attribute Write Request packet and converts the Attribute Write Request packet into the GATT characteristic Write Request command, which is the abstract Attribute Write Request packet. Furthermore, the communication unit 60 outputs the GATT characteristic Write Request command to the communication management unit 61 (S319). The communication management unit 51 outputs the GATT characteristic Write Request command as the write request to the reading-and-writing processing unit 62 (S320). The reading-and-writing processing unit 62 overwrites the period of time that has been written in the specific area of the storage unit 63 at S306 with the invalid value as the cancellation information specified by the write request (S321). Subsequently, the reading-and-writing processing unit 62 notifies the instruction unit 65 of the completion of the writing (S322).

When the time measured by the time measuring unit 64 reaches the period of time written in the storage unit 63, the time measuring unit 64 notifies the instruction unit 65 that the time measuring unit 64 measures the period of time (S323). Although the instruction unit 65 receives the notification, the instruction unit 65 does not generate the disconnection request, because the value of the period of time stored in the storage unit 63 is the invalid value. Accordingly, the instruction unit 65 does not instruct the transmission of the disconnection request. In other words, the instruction unit 65 does not instruct the disconnection.

In order to request the disconnection again, the request output unit 52 generates the write request for requesting writing of the period of time and outputs the write request to the communication management unit 51. The communication management unit 51 outputs the received write request as the GATT characteristic Write Request command to the communication unit 50 (S325). The communication unit 50 converts the GATT characteristic Write Request command into the Attribute Write Request packet and transmits the Attribute Write Request packet to the image forming apparatus 11 (S326).

In the image forming apparatus 11, the communication unit 60 receives the Attribute Write Request packet and converts the Attribute Write Request packet into the GATT characteristic Write Request command, which is the abstract Attribute Write Request packet. Further, the communication unit 60 outputs the GATT characteristic Write Request command to the communication management unit 61 (S327). The communication management unit 51 outputs the GATT characteristic Write Request command as the write request to the reading-and-writing processing unit 62 (S328). The reading-and-writing processing unit 62 overwrites the value that has been written in the specific area of the storage unit 63 at S321 with the period of time by the write request (S329). Subsequently, the reading-and-writing processing unit 62 notifies the instruction unit 65 of the completion of the writing (S330).

The instruction unit 65 instructs the time measuring unit 64 to start measuring time (S331). In response to receiving the instruction, the time measuring unit 64 starts measuring time (S332).

When the time measured by the time measuring unit 64 reaches the period of time written in the storage unit 63, the time measuring unit 64 notifies the instruction unit 65 that the time measuring unit 64 measures the period of time (S333). The instruction unit 65 checks the value stored in the storage unit 63 and generates the disconnection request for disconnecting the connection with the smart device 10. Further, the instruction unit 65 outputs the disconnection request to the communication management unit 61 to instruct the disconnection (S334). The communication management unit 61 outputs the disconnection request as the LE_Disconnect command to the communication unit 60 (S335). The communication unit 60 converts the LE_Disconnect command into the LL_TERMINTE_IND packet and transmits the LL_TERMINATE_IND packet to the smart device 10 (S336).

In response to receiving the LL_TERMINTE_IND packet, the communication unit 50 of the smart device 10 sends back the LL ack packet as a reply (S337). In response to receiving the LL ack packet, the communication unit 60 of the image forming apparatus 11 converts the LL ack packet to the LE Disconnection Complete event. Further, the communication unit 60 outputs LE Disconnection Complete event to the communication management unit 61 (S338). The communication management unit 61 transmits, to the instruction unit 65, the LE Disconnection Complete event as a notification indicating the completion of the disconnection (S339).

The communication unit 50 of the smart device 10 converts the LL_TERMINATE_IND packet received from the image forming apparatus 11 into the LE Disconnection Complete event and outputs the LE Disconnection Complete event to the communication management unit 51 (S340). The communication management unit 51 outputs, to the request output unit 52, the LE Disconnection Complete event as a notification indicating the completion of the disconnection (S341).

As described heretofore, the smart device 10 transmits the write request in accordance with the user instruction to disconnect the connection between the smart device 10 and the image forming apparatus 11. Alternatively, the disconnection may be performed without the user instruction. Specifically, a setting is configured such that the connection is disconnected in a predetermined period of time from the establishment of the connection. When the time measured by the time measuring unit 64 reaches the predetermined period of time, the disconnection process is automatically started. Thus, the connection is disconnected automatically, for example, when the smart device 10 and the image forming apparatus 11 are in a wireless connection for a long period of time due to an operation error made by the user and thereby the smart device 10 occupies the wireless connection with the image forming apparatus 11. Further, the period of time when the other smart device cannot communicate with the image forming apparatus 11 is shortened.

Figure 12B:
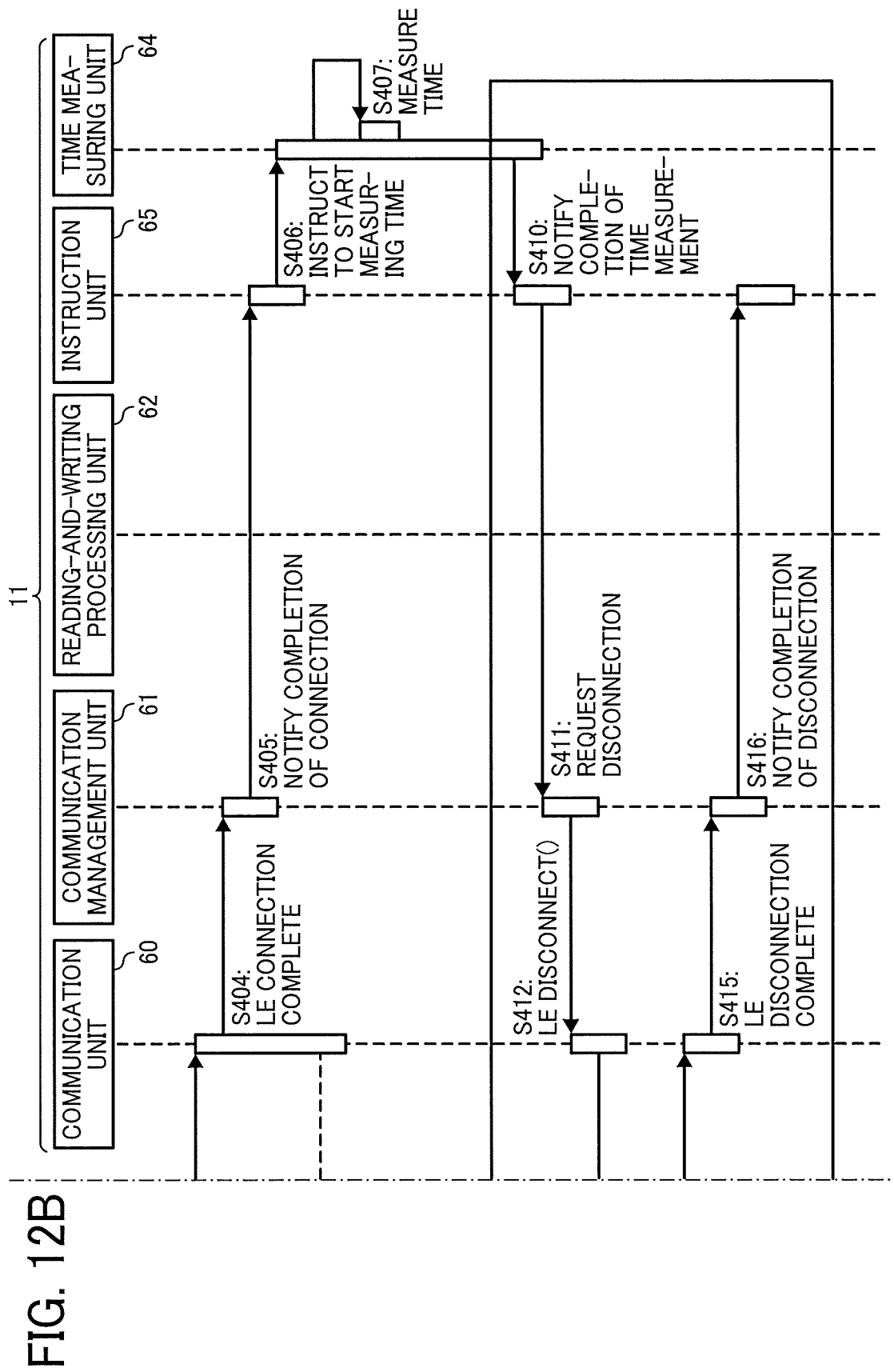

Hereinafter, a description is given of an operation of automatically performing the disconnection process with reference to FIGS. 12A and 12B. In response to receiving a user instruction for connection, for example, the request output unit 52 generates the connection request for connecting with the image forming apparatus 11. Further, the request output unit 52 transmits the connection request to the communication management unit 51 (S401). The communication management unit 51 outputs the connection request as the LE Create Connection command to the communication unit 50 (S402). The communication unit 50 converts the LE Create Connection command into the CONNECT_REQ packet and transmits the CONNECT_REQ packet to the image forming apparatus 11 (S403).

In response to receiving the CONNECT_REQ packet, the communication unit 60 of the image forming apparatus 11 exchanges the connection parameters with the smart device 10 to establish the connection. The communication unit 60 outputs the LE Connection Complete event indicating the establishment of the connection to the communication management unit 61 (S404). The communication management unit 61 outputs, to the instruction unit 65, the LE Connection Complete event as a notification of the completion of connection (S405). The instruction unit 65 instructs the time measuring unit 64 to start measuring time (S406). In response to receiving the instruction, the time measuring unit 64 starts measuring the period of time written in the specific area of the storage unit 63 (S407).

Once the connection is established, the communication unit 50 of the smart device 10 outputs the LE Connection Complete event indicating the establishment of connection to the communication management unit 51 (S408). The communication management unit 51 outputs, to the request output unit 52, the LE Connection Complete event as a notification of the completion of connection (S409). The request output unit 52 displays an image indicating the completion of connection on the display 25, for example, to notify the user of the result.

When the time measured by the time measuring unit 64 reaches the period of time written in the specific area of the storage unit 63, the time measuring unit 64 notifies the instruction unit 65 that the time measuring unit 64 measures the period of time (S410). In an example illustrated in FIGS. 12A and 12B, the value written in the storage unit 63 is not changed. Accordingly, the instruction unit 65 generates the disconnection request for disconnecting the connection with the smart device 10. Further, the instruction unit 65 transmits the disconnection request to the communication management unit 61 to instruct the disconnection (S411). The communication management unit 61 outputs the disconnection request as the LE_Disconnect command to the communication unit 60 (S412). The communication unit 60 converts the LE_Disconnect command into the LL_TERMINTE_IND packet and transmits the LL_TERMINATE_IND packet to the smart device 10 (S413).

In response to receiving the LL_TERMINTE_IND packet, the communication unit 50 of the smart device 10 sends back the LL ack packet as a reply (S414). In response to receiving the LL ack packet, the communication unit 60 of the image forming apparatus 11 converts the LL ack packet to the LE Disconnection Complete event. Further, the communication unit 60 outputs LE Disconnection Complete event to the communication management unit 61 (S415). The communication management unit 61 transmits, to the instruction unit 65, the LE Disconnection Complete event as a notification indicating the completion of the disconnection (S416).

Further, the communication unit 50 of the smart device 10 converts the LL_TERMINATE_IND packet received from the image forming apparatus 11 into the LE Disconnection Complete event and outputs the LE Disconnection Complete event to the communication management unit 51 (S417). The communication management unit 51 outputs, to the request output unit 52, the LE Disconnection Complete event as a notification indicating the completion of the disconnection (S418).

Note that although a description has been given heretofore of the operation performed by the smart device 10 as an example of a communication terminal and the image forming apparatus 11 as an example of an information processing apparatus based on the specification of the BLE. However, the wireless communication based on the BLE is just one example of the communication between the smart device 10 and the image forming apparatus 11. Accordingly, the above-described embodiments may be applied to any other wireless communication. Further, in the above-described embodiments, the value written in the specific area of the storage unit 63 is overwritten with another value. Alternatively, the other value may be stored in a different area. In this case, a value that is written most recently is adopted.

Figure 13A:
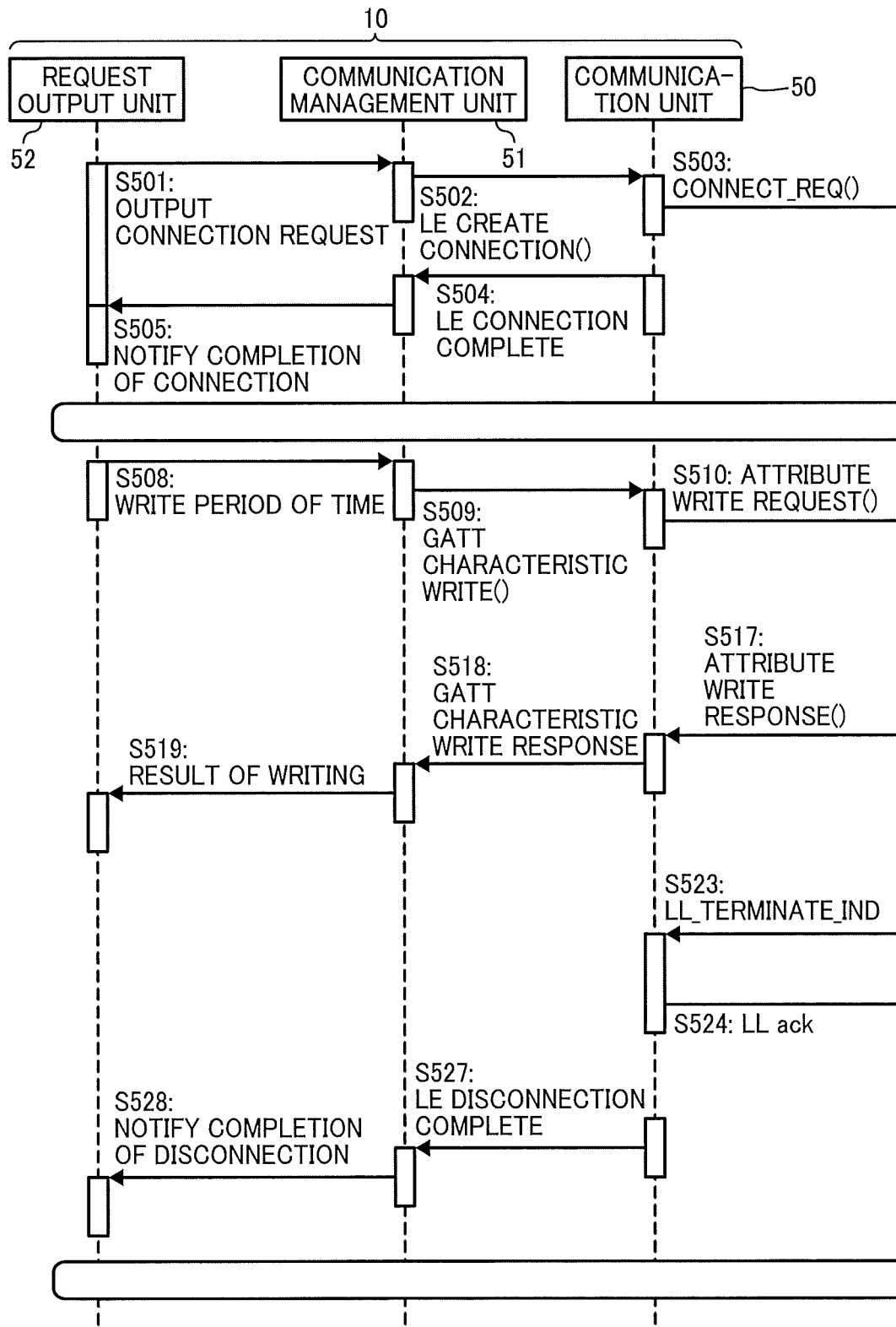
FIGS. 13A and 13B are a sequence diagram illustrating a specific use case of an operation performed by communication system.
Figure 13B:
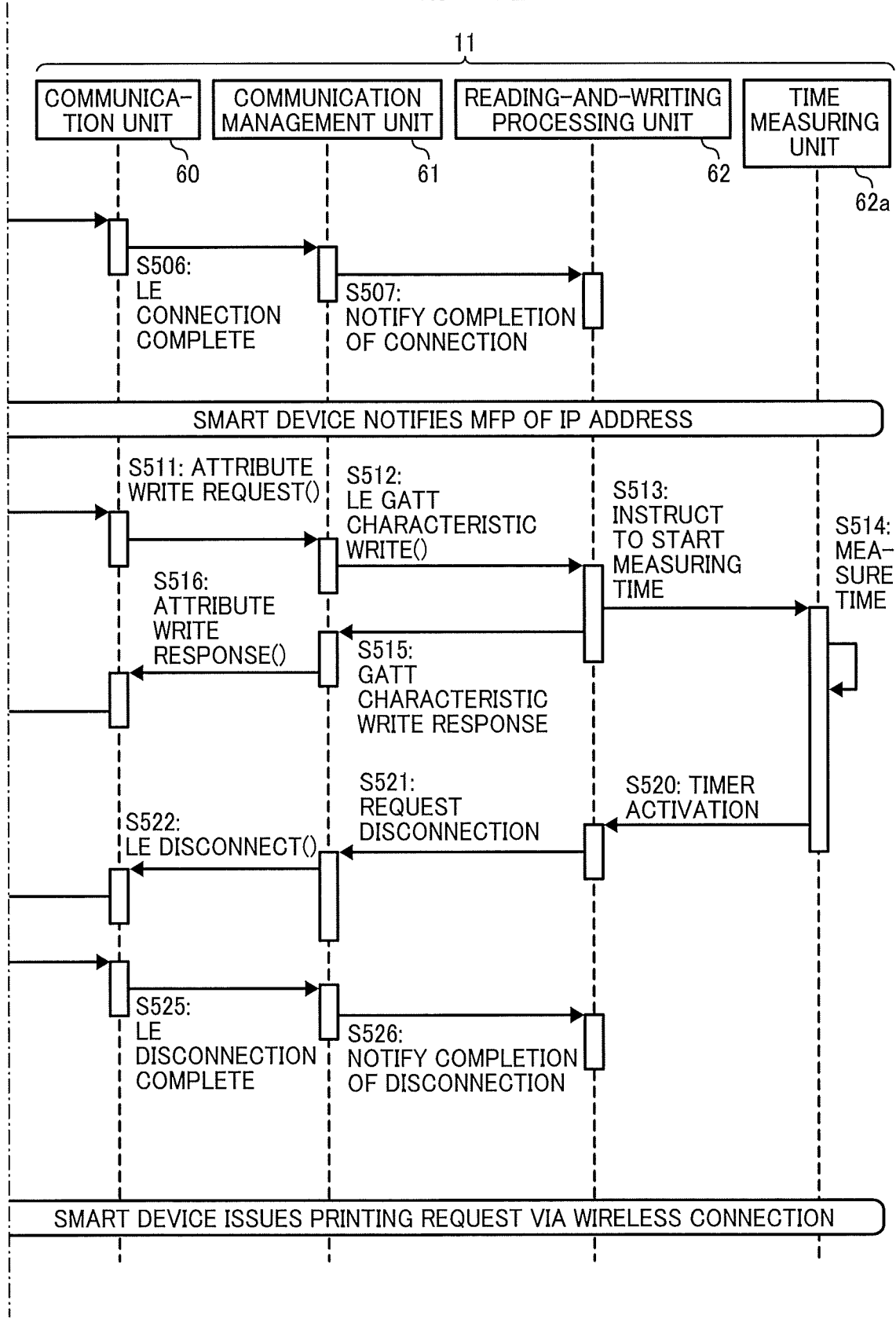

Hereinafter, a description is given of the specific use case of the communication system according to an embodiment of the present invention. FIGS. 13A and 13B are a sequence diagram illustrating an operation of acquiring, via a wireless communication, print settings that enables the smart device 10 to instruct the image forming apparatus 11 to perform printing or information that enables the smart device 10 to connect wirelessly to image forming apparatus 11, prior to the printing. First, the request output unit 52 of the smart device 10 outputs the connection request using the API provided by the platform (S501). In response to receiving the connection request, the communication management unit 51 of the smart device 10 transmits the LE Create Connection command to the communication unit 50 (S502).

In response to receiving the LE Create Connection command, the communication unit 50 of the smart device 10 transmits the CONNECT_REQ command as the connection request to the communication unit 60 of the image forming apparatus 11 (S503). The smart device 10 and the image forming apparatus 11 exchange parameters relating to the connection to establish the connection. When the connection is established, the communication unit 50 of the smart device 10 transmits the LE Connection Complete event to the communication management unit 51 as the host (S504). In response to receiving the LE Connection Complete event, the communication management unit 51 notifies the request output unit 52 of the completion of connection (S505).

On the other hand, when the connection is established, the communication unit 60 of the image forming apparatus 11 transmits the LE Connection Complete event indicating the completion of connection to the communication management unit 61 (S506). In response to receiving the LE Connection Complete event, the communication unit 60 notifies the reading-and-writing processing unit 62 of the completion of connection (S507). With this operation, the connection from the smart device 10 to the image forming apparatus 11 is completed. Subsequently, the smart device 10 and the image forming apparatus 11 exchanges parameters used in printing or data used in another wireless connection via the wireless communication established with the operations from S501 to S507.

Specifically, the smart device 10 notifies the image forming apparatus 11 of its own IP address as an example of communication information. Alternatively, the image forming apparatus 11 may notify the smart device 10 of its own IP address. The notification of the IP address is not required be performed bidirectionally. In other words, the IP address is required to be transmitted either from the image forming apparatus 11 to the smart device 10 or from the smart device 10 to image forming apparatus 11 in one direction.

The IP address is just one example of the communication information to be notified, any communication information used for the wireless connection between the smart device 10 and the image forming apparatus 11 may be notified. Examples of the communication information include a media access control (MAC) address and a service set identifier (SSID). Note that, in the present embodiment, the wireless connection means a wireless communication using a communication infrastructure different from the BLE. The wireless connection may be implemented using any communication protocol such as the IEEE 802.X standard, long term evolution (LTE), Wi-Fi, and 3G.

Subsequently, the request output unit 52 of the smart device 10 issues the write request for requesting writing of a set period of time to the communication management unit 51 in order to disconnect the connection that has no need to be kept active (S508). Once the notification of the IP address is completed, in the present embodiment, the request output unit 52 of the smart device 10 requests writing of the period of time in order to disconnect the connection immediately. In an example as illustrated in FIGS. 13A and 13B, the period of time is set to one second to disconnect the connection immediately. With this setting, the disconnection request is transmitted from the image forming apparatus 11 once the time measured by the timer of the image forming apparatus 11 reaches 1 second.

Once the disconnection is completed, the smart device 10 and the image forming apparatus 11 are connected wirelessly using the communication information, and the smart device 10 sends print settings or print data to the image forming apparatus 11. The image forming apparatus 11 performs printing based on the print settings and the print data. In response to receiving the write request for writing the period of time, the communication management unit 51 sets the period of time to the GATT characteristic value and transmits the GATT Characteristic Write command to the communication unit 50 (S509). In response to receiving the GATT characteristic Write command, the communication unit 50 transmits the Attribute Write Request command to the communication unit 60 of the image forming apparatus 11 (S510).

The communication unit 60 of the image forming apparatus 11 passes the Attribute Write Request command to the communication management unit 61 (S511). The communication management unit 61 instructs the reading-and-writing processing unit 62 to write the GATT characteristic value (S512). The reading-and-writing processing unit 62 instructs a timer 62a to start measuring time using the received GATT characteristic value (S513). In response to the instruction, the timer 62a starts measuring time immediately (S514).

After issuing the instruction to the timer 62a at S513, the reading-and-writing processing unit 62 issues, to the communication management unit 61, the GATT Characteristic Write response as a notification of the completion of writing of the GATT characteristic value (S515). The communication management unit 61 issues the Attribute Write Response to the communication unit 60 (S516). The communication unit 60 of the image forming apparatus 11 notifies the communication unit 50 of the smart device 10 of the Attribute Write Response to (S517).

In response to receiving the Attribute Write Response, the communication unit 50 notifies the communication management unit 51 of the GATT characteristic Write Response (S518). The communication management unit 51 notifies the request output unit 52 of the completion of writing (S519).

When the time measured by the timer 62a reaches the written period of time, e.g., 1 second (S520), the reading-and-writing processing unit 62 transmits the disconnection request for disconnecting the connection to the communication management unit 61 (S521). The communication management unit 61 transmits the LE Disconnect command to the communication unit 60 to disconnect the connection with the smart device 10 (S522). The communication unit 60 transmits the LL_TERMINATE_IND packet to the communication unit 50 of the smart device 10 (S523). In response to receiving the LL_TERMINATE_IND packet, the communication unit 50 of the smart device 10 issues the LL ack packet to the communication unit 60 of the image forming apparatus 11 (S524). In response to receiving the LL ack packet, the communication unit 60 of the image forming apparatus 11 notifies the communication management unit 61 of the LE Disconnection Complete event as a notification of the completion of disconnection (S525).

The communication management unit 61 issues the notification of the completion of disconnection to the reading-and-writing processing unit 62 (S526). Thus, the disconnection process on the image forming apparatus 11 side ends.

After issuing LL ack packet to the communication unit 60 at S524, the communication unit 50 of the smart device 10 issues, to the communication management unit 51, LE Disconnection Complete event as a notification of the completion of disconnection (S527). In response to receiving this notification, the communication management unit 51 of the smart device 10 notifies the request output unit 52 of the completion of disconnection (S528). Thus, the disconnection process on the smart device 10 side also ends. Subsequently, the smart device 10 and the image forming apparatus 11 connect wirelessly with each other using a wireless LAN, for example, to start printing.

According to the above-described embodiments of the present invention, the smart device 10 as an example of the communication terminal is able to disconnect the connection with the image forming apparatus as an example of the information processing apparatus at the timing that the smart device 10 designates. Accordingly, the period of time when the other smart device cannot communicate with the image forming apparatus 11 is shortened.

Although a description has been made heretofore of the communication system, the information processing apparatus, the communication terminal, the method for disconnecting the connection, and the program according to embodiments of the present invention, the above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Accordingly, according to an embodiment of the present invention, a recording medium storing the program and an external device that provides the program via a network, etc., are provided.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

What is claimed is:

1. An information processing apparatus configured to communicate with a communication terminal, the information processing apparatus comprising:
 a receiver to receive, from the communication terminal, a transmission request, generated at an application layer of the communication terminal, that requests that the information processing apparatus transmit a disconnection request to the communication terminal at a predetermined timing specified in the transmission request, the disconnection request being a request for requesting disconnection of a communication between the information processing apparatus and the communication terminal via a communication protocol layer that is implemented by both the information processing apparatus and the communication terminal and is separate from application layer of the communication terminal;

circuitry to, in response to receiving the transmission request, issue an instruction for transmission of the disconnection request to the communication terminal at the predetermined timing; and a transmitter to transmit the disconnection request to the communication terminal in accordance with the instruction, wherein the transmitter disconnects the communication between the information processing apparatus and the communication terminal in response to receiving a reply, from the communication terminal via the communication protocol layer, to the disconnect request.

2. The information processing apparatus of claim 1, wherein the transmission request is a write request for causing the circuitry to write, in a storage unit of the information processing apparatus, information relevant to the transmission of the disconnection request, and the circuitry is further configured to write, in the storage unit, the information relevant to the transmission of the disconnection request in accordance with the write request.

3. The information processing apparatus of claim 2, wherein the information relevant to the transmission of the disconnection request is a period of time, as the predetermined timing, to be measured until the transmitter transmits the disconnection request to the communication terminal, and the circuitry is further configured to:

in response to writing of the period of time to be measured in the storage unit, start measuring time, and issue the instruction for transmission of the disconnection request when the measured time reaches the period of time written in the storage unit.

4. The information processing apparatus of claim 3, wherein the circuitry is further configured to, while measuring the time, receive at least one of a write request for writing information in the storage unit and a read request for reading information from the storage unit, and perform at least one of reading of the information and writing of the information.

5. The information processing apparatus of claim 2, wherein the circuitry is further configured to write, in the storage unit, information indicating cancellation of disconnection process in accordance with a request from the communication terminal, and the circuitry cancels issuance of the instruction for the transmission of the disconnection request based on the information indicating the cancellation written in the storage unit.

6. The information processing apparatus of claim 4, wherein the circuitry is further configured to:

encode information to be transmitted to the communication terminal; and decode encoded information received from the communication terminal.

7. The information processing apparatus of claim 1, wherein the communication between the communication terminal and the information processing apparatus is a wireless communication using Bluetooth, and the disconnection request is LL_TERMINATE_IND packet.

8. The information processing apparatus of claim 7, wherein the transmission request is a packet of a type different from the LL_TERMINATE_IND packet.

9. The information processing apparatus of claim 8, wherein the packet of the different type is Attribute Write Request packet.

10. The information processing apparatus of claim 1, wherein the information processing apparatus is an image forming apparatus, and the receiver receives the transmission request from the communication terminal, after the image forming apparatus receives, from the communication terminal, communication information used for performing a communication different from the communication with the communication terminal.

11. A communication system comprising a communication terminal and an information processing apparatus configured to communicate with each other, wherein the communication terminal includes:

first circuitry to output a write request for causing the information processing apparatus to write, in a storage unit of the information processing apparatus, information relevant to transmission of a disconnection request for disconnecting a communication between the information processing apparatus and the communication terminal; and a first transmitter to transmit the write request to the information processing apparatus, the information processing apparatus includes:

a receiver to receive the write request;

second circuitry to:

write, in the storage unit, the information relevant to the transmission of the disconnection request;

start measuring time in response to a completion of the writing of the information relevant to the transmission of the disconnection request, the information indicating a period of time to be measured until the transmission of the disconnection request; and issue an instruction for the transmission of the disconnection information to the communication terminal when the measured time reaches the period of time; and a second transmitter to transmit, in response to the instruction, the disconnection request to the communication terminal, the first transmitter transmits a reply to the disconnection request in response to receiving the disconnection request from the information processing apparatus, and the second transmitter disconnects the communication between the communication terminal and the information processing apparatus in response to receiving the reply, from the communication terminal, to the disconnection request.

12. A communication terminal configured to communicate with an information processing apparatus, the terminal comprising:

circuitry to output a transmission request, generated at an application layer of the communication terminal, that requests that the information processing apparatus transmit a disconnection request to the communication terminal at a predetermined timing specified in the transmission request, the disconnection request being a request for requesting disconnection of a communication between the information processing apparatus and the communication terminal via a communication protocol layer that is implemented by both the information processing apparatus and the communication terminal and is separate from application layer of the communication terminal; and a transmitter to transmit the transmission request to the information processing apparatus, wherein the transmitter receives the disconnection request from the information processing apparatus based on the predetermined timing and transmits a reply via the communication protocol layer, to the information processing apparatus, in response to receiving the disconnection request to cause the information processing apparatus to disconnect the communication between the communication terminal and the information processing apparatus.

* * * * *